(12) United States Patent
Hagihara

(10) Patent No.: US 12,147,857 B2
(45) Date of Patent: Nov. 19, 2024

(54) RFID-TAGGED FLEXIBLE MATERIAL HAVING AN ANTENNA CONTAINING A CARBON NANOTUBE YARN AND METHOD FOR MANUFACTURING

(71) Applicant: LINTEC CORPORATION, Tokyo (JP)

(72) Inventor: Yoshiaki Hagihara, Tokyo (JP)

(73) Assignee: LINTEC CORPORATION, Tokyo (JP)

( * ) Notice: Subject to any disclaimer, the term of this patent is extended or adjusted under 35 U.S.C. 154(b) by 0 days.

(21) Appl. No.: 17/633,155

(22) PCT Filed: Sep. 4, 2020

(86) PCT No.: PCT/JP2020/033675
§ 371 (c)(1),
(2) Date: Feb. 4, 2022

(87) PCT Pub. No.: WO2021/054156
PCT Pub. Date: Mar. 25, 2021

(65) Prior Publication Data
US 2022/0343123 A1 Oct. 27, 2022

(30) Foreign Application Priority Data
Sep. 17, 2019 (JP) ................. 2019-168026

(51) Int. Cl.
*G06K 19/02* (2006.01)
*D02G 3/16* (2006.01)
*G06K 19/077* (2006.01)

(52) U.S. Cl.
CPC ............. *G06K 19/025* (2013.01); *D02G 3/16* (2013.01); *G06K 19/027* (2013.01); *G06K 19/0772* (2013.01); *D10B 2101/122* (2013.01)

(58) Field of Classification Search
CPC .... G06K 19/02; G06K 19/025; G06K 19/027; G06K 19/0772; G06K 19/07749; H01Q 17/005; D02G 3/16; D10B 2101/122
(Continued)

(56) References Cited

U.S. PATENT DOCUMENTS

| 9,336,476 B1 * | 5/2016 | Liu .................. G06K 19/07754 |
| 2003/0160732 A1 * | 8/2003 | Van Heerden ... G06K 19/07749 343/897 |

(Continued)

FOREIGN PATENT DOCUMENTS

| CN | 101437663 B | 6/2013 |
| JP | 2011-040919 A | 2/2011 |

(Continued)

OTHER PUBLICATIONS

"strand". OED.com. Oxford English Dictionary, 1989. Web. Jan. 24, 2023. (Year: 2023).*
(Continued)

*Primary Examiner* — Suezu Ellis
(74) *Attorney, Agent, or Firm* — Rimon P.C.

(57) ABSTRACT

For example, provided is an RFID-bearing flexible material, in which an RFID is attached to a flexible material, the RFID includes an antenna portion, and the antenna portion is formed of a conductive linear body containing a carbon nanotube yarn.

11 Claims, 18 Drawing Sheets

(58) Field of Classification Search
USPC .............................. 235/492; 340/572.1, 572.7
See application file for complete search history.

(56) References Cited

U.S. PATENT DOCUMENTS

| | | | |
|---|---|---|---|
| 2006/0201571 A1* | 9/2006 | Stobbe ..................... | H01Q 1/38 |
| | | | 139/426 R |
| 2006/0290497 A1* | 12/2006 | Sugata ..................... | A44B 1/08 |
| | | | 340/572.1 |
| 2007/0166223 A1* | 7/2007 | Jiang ........................ | D02G 3/16 |
| | | | 423/460 |
| 2007/0257859 A1* | 11/2007 | Lashmore ............... | D01F 9/127 |
| | | | 977/785 |
| 2008/0170982 A1* | 7/2008 | Zhang ..................... | D02G 3/44 |
| | | | 423/447.3 |
| 2010/0001846 A1 | 1/2010 | Cardullo | |
| 2011/0220722 A1 | 9/2011 | Yu et al. | |
| 2013/0251619 A1 | 9/2013 | Rikihisa et al. | |
| 2018/0237295 A1* | 8/2018 | Kumagai ................ | C01B 32/16 |
| 2018/0248248 A1* | 8/2018 | Vleurinck ............ | H01Q 1/2225 |
| 2019/0057289 A1* | 2/2019 | Bauer ................... | G08B 13/2445 |
| 2020/0117965 A1* | 4/2020 | Drossaert ............. | G06K 19/027 |
| 2022/0220641 A1* | 7/2022 | Hagihara ................ | D02G 3/16 |

FOREIGN PATENT DOCUMENTS

| | | | |
|---|---|---|---|
| JP | 2013-171428 A | | 9/2013 |
| KR | 10-0822850 81 | | 4/2008 |
| TW | 201202134 A | * | 1/2012 |
| TW | 201841129 A | | 11/2018 |
| WO | 2012/070537 A1 | | 5/2012 |
| WO | 2019/146237 A1 | | 8/2019 |

OTHER PUBLICATIONS

Machine translation of TW201202134, retrieved from EPO, retrieved on Aug. 12, 2023 (Year: 2023).*

International Preliminary Report on Patentability, dated Mar. 15, 2022, for International application No. PCT/JP2020/033675. 4 pages.

International Search Report issued in corresponding International Patent Application No. PCT/JP2020/033675, dated Nov. 17, 2020, with English translation.

Office Action dated Aug. 16, 2024, issued in corresponding Taiwanese application No. 109131245.

* cited by examiner

RFID-TAGGED FLEXIBLE MATERIAL HAVING AN ANTENNA CONTAINING A CARBON NANOTUBE YARN AND METHOD FOR MANUFACTURING

CROSS REFERENCE TO RELATED APPLICATIONS

This patent application is the U.S. National Phase under 35 U.S.C. § 371 of International Application No. PCT/JP2020/033675, filed on Sep. 4, 2020, which claims the benefit of Japanese Patent Application No. 2019-168026, dated Sep. 17, 2019, the entire contents of each are hereby incorporated by reference in their entirety.

TECHNICAL FIELD

The present invention relates to an RFID-bearing flexible material, an RFID-bearing article, and a method for producing an RFID-bearing flexible material.

BACKGROUND ART

Use of wireless communication systems using an RFID (Radio-Frequency-Identifier) tag is expanding.

An RFID tag includes an IC chip including a circuit; and an antenna for wireless communication with a reader and a writer. RFID tags are attached to various articles for use and, in recent years, may be attached to flexible materials, such as fabrics, for use.

For example, Patent Document 1 discloses an RFID tag including a tag substrate and an RFID inlet provided to the tag substrate, the RFID inlet including an IC chip and an RFID antenna and enabling data communication. The tag substrate described in Patent Document 1 is made from a fabric material, a leather material, or any other flexible material, and a booster antenna portion is constituted of a conductive thread integrated into the tag substrate by weaving or sewing. In addition, FIG. 4 of Patent Document 1 discloses a conductive thread formed by integrating a metal into a fiber thread of polyester or the like by plating technique, for example.

Patent Document 2 discloses a fabric for an antenna including: a base fabric made of a fiber material having a relative permittivity of 4 or less; and an antenna wire made of a conductive thread formed by covering a core thread with a metal fiber and having a resistance from 5 Ω/m to 15 Ω/m, the antenna wire being kept in close contact with the base fabric.

CITATION LIST

Patent Literatures

Patent Document 1: JP 2013-171428 A
Patent Document 2: JP 2011-040919 A

SUMMARY OF INVENTION

Technical Problem

However, the conductive thread formed by integrating a metal into a fiber thread described in Patent Document 1 and the conductive thread formed by covering a core thread with a metal fiber described in Patent Document 2 are less likely to conform to the bending of a flexible material, such as a fabric. Thus, the booster antenna portion described in Patent Document 1 and the antenna wire described in Patent Document 2 formed using these conductive threads tend to have insufficient flexibility to flexible materials.

In recent years, use of RFID-bearing flexible materials is expanding, and the shape of the antenna portion is diversified. Thus, further improvement in flexibility is required for an RFID-bearing flexible material including an antenna portion.

An object of the present invention is to provide an RFID-bearing flexible material excellent in flexibility and having corrosion resistance, an RFID-bearing article, and a method for producing an RFID-bearing flexible material.

Solution to Problem

An aspect of the present invention provides an RFID-bearing flexible material, the RFID being attached to a flexible material, wherein the RFID includes an antenna portion, and the antenna portion is formed of a conductive linear body containing a carbon nanotube yarn.

In the RFID-bearing flexible material according to an aspect of the present invention, the carbon nanotube yarn is preferably a yarn bundle of a plurality of carbon nanotube yarns bundled together or one strand of carbon nanotube yarn.

In the RFID-bearing flexible material according to an aspect of the present invention, the carbon nanotube yarn is the yarn bundle, and a major axis length of a cross section of the yarn bundle orthogonal to the longitudinal axis direction of the yarn bundle is preferably from 7 μm to 5000 μm.

In the RFID-bearing flexible material according to an aspect of the present invention, the carbon nanotube yarn is the one strand of carbon nanotube yarn, and a diameter of the one strand of carbon nanotube yarn is preferably from 5 μm to 100 μm.

In the RFID-bearing flexible material according to an aspect of the present invention, the conductive linear body is preferably twisted.

In the RFID-bearing flexible material according to an aspect of the present invention, the conductive linear body preferably contains a resin.

In the RFID-bearing flexible material according to an aspect of the present invention, the carbon nanotube yarn is preferably a yarn bundle of a plurality of carbon nanotube yarns bundled together or one strand of carbon nanotube yarn, the resin is preferably a strand-like resin, and the strand-like resin and the yarn bundle or the one strand of carbon nanotube yarn are preferably twisted together.

In the RFID-bearing flexible material according to an aspect of the present invention, the carbon nanotube yarn is preferably a yarn bundle of a plurality of carbon nanotube yarns bundled together or one strand of carbon nanotube yarn, and at least a portion of the outer periphery of the yarn bundle or the one strand of carbon nanotube yarn is preferably coated with the resin.

In the RFID-bearing flexible material according to an aspect of the present invention, the resin is preferably a thermoplastic resin or a curable resin.

In the RFID-bearing flexible material according to an aspect of the present invention, the conductive linear body preferably further contains a conductive material.

In the RFID-bearing flexible material according to an aspect of the present invention, the conductive material is preferably a carbon material.

In the RFID-bearing flexible material according to an aspect of the present invention, the antenna portion is preferably formed by weaving, knitting, embroidering, or sewing the conductive linear body in the flexible material.

In the RFID-bearing flexible material according to an aspect of the present invention, the flexible material is preferably a woven fabric, a knitted fabric, a nonwoven fabric, felt, paper, a gel sheet, or an adhesive sheet including a flexible substrate.

In the RFID-bearing flexible material according to an aspect of the present invention, the RFID-bearing flexible material is preferably removably attached to an article.

In the RFID-bearing flexible material according to an aspect of the present invention, the flexible material preferably includes an adhesive layer removably adhering to an article.

An aspect of the present invention provides an RFID-bearing article, wherein the RFID-bearing flexible material according to an aspect of the present invention described above is removably attached to the article.

An aspect of the present invention provides a method for producing an RFID-bearing flexible material, the RFID being attached to a flexible material, the RFID including an antenna portion, the method including forming the antenna portion on the flexible material using a conductive linear body containing a carbon nanotube yarn.

An aspect of the present invention can provide an RFID-bearing flexible material; which has excellent flexibility and corrosion resistance, an RFID-bearing article, and a method for producing an RFID-bearing flexible material.

DESCRIPTION OF EMBODIMENTS

In the present specification, a "flexible material" means a material having sufficient elasticity to conform to a curved surface. The flexible material is not particularly limited, and examples of the flexible material include woven fabrics; knitted fabrics; nonwoven fabrics; felt; paper; gel sheets; adhesive sheets including a flexible substrate; rubber sheets; soft resin sheets; and sponges.

In the present specification, a linear body means a linear member. The length of the linear body is, for example, 1 cm or longer. The form of the linear body is not particularly limited and may be a single linear member or an assembly of a plurality of linear members. The cross-sectional shape of the linear body can be various shapes depending on the form of the linear body.

RFID-Bearing Flexible Material

A first embodiment of the present invention will be described with reference to the drawings.

In the following descriptions, a carbon nanotube may be referred to as a "CNT".

First Embodiment

Figure 1:
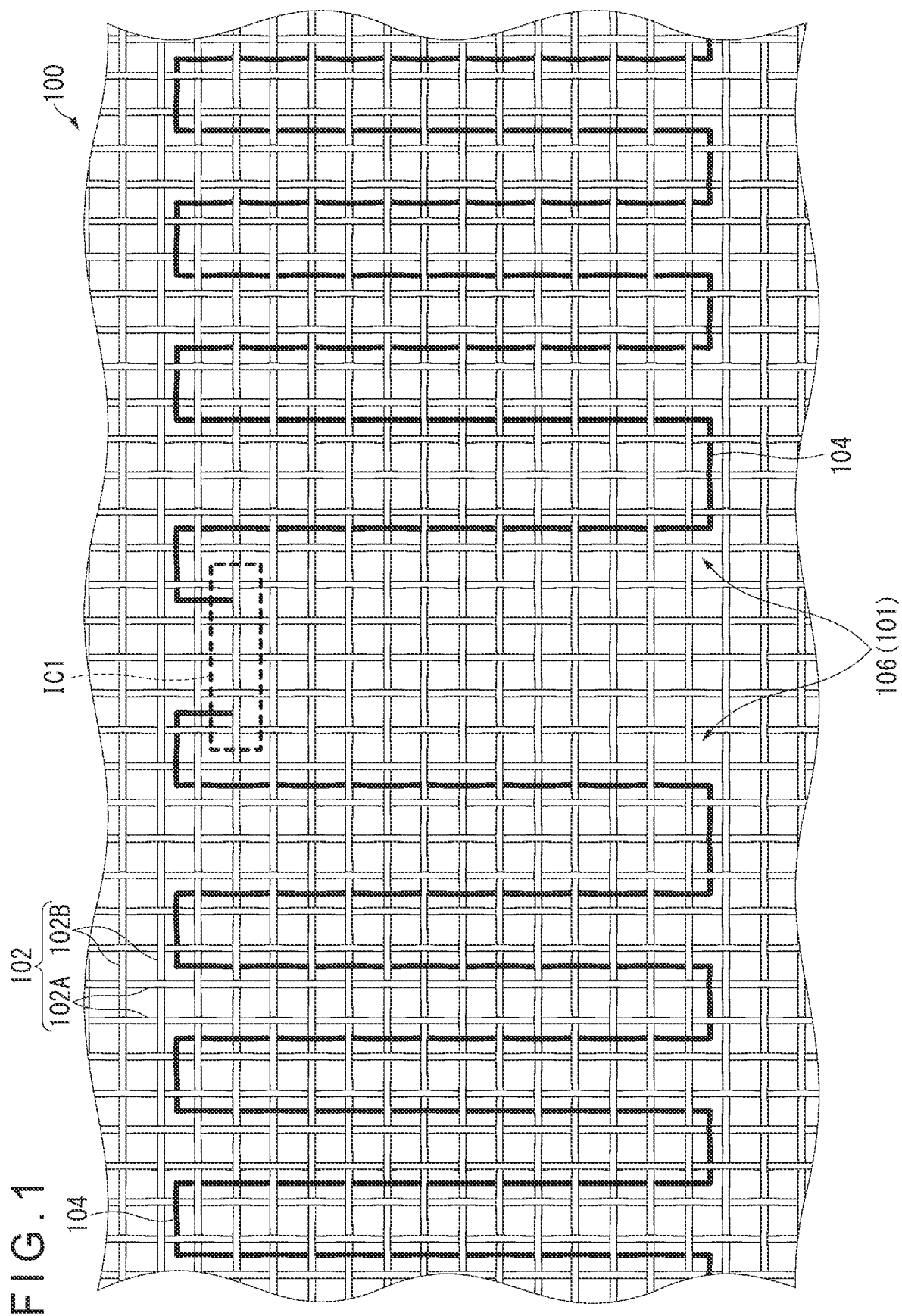
FIG. 1 is a plan view of an RFID-bearing flexible material according to a first embodiment.

FIG. 1 is a plan view of an RFID-bearing flexible material 100 according to a first embodiment.

An RFID 101 is attached to the RFID-bearing flexible material 100, An antenna portion 106 is formed of a conductive linear body 104, and the conductive linear body 104 contains a CNT yarn.

In the first embodiment, a flexible material 102 is a woven fabric, and the RFID 101 includes an antenna portion 106. The woven fabric is woven by crossing warps 102A and wefts 102B. FIG. 1 illustrates the antenna portion 106 having a specific pattern. The antenna portion 106 is formed by repeatedly bending and weaving the conductive linear body 104 containing a CNT yarn in a woven fabric serving as the flexible material 102. The pattern of the antenna portion 106 may be modified according to the use of the RFID-bearing flexible material 100. In addition, examples of the woven fabric include plain weaves, twill weaves, satin weaves, and well-known applied weaves.

The RFID-bearing flexible material 100 functions as an RFID tag, for example, by attaching an IC chip to a dotted region IC1 illustrated in FIG. 1. The IC chip can be attached by a well-known means.

The conductive linear body 104 used in the RFID-bearing flexible material 100 of the present embodiment contains a CNT yarn and is superior in flexibility compared to the known conductive threads described in Patent Documents 1 and 2. The RFID-bearing flexible material 100 of the present embodiment includes the antenna portion 106 formed using the conductive linear body 104 excellent in flexibility and thus can improve the flexibility of the entire RFID-bearing flexible material 100 including the antenna portion 106. Furthermore, the conductive linear body 104 contains a CNT yarn and thus has better corrosion resistance compared to, for example, a conductive linear body made of copper wire. Thus, it is surmised that an RFID formed using the conductive linear body 104 can impart RFID functionality for a longer period.

The present embodiment achieves an RFID-bearing flexible material 100 excellent in flexibility and having corrosion resistance.

The conductive linear body 104 used in the RFID-bearing flexible material 100 of the present embodiment is excellent in flexibility and thus can be woven, knitted, embroidered, or sewn in a flexible material in the same manner as a normal thread. That is, the antenna portion 106 in the present embodiment is formed by a technique (hereinafter, also referred to as "technique A"), such as weaving, knitting, embroidering, or sewing the conductive linear body 104 in a flexible material, and thus antenna portions can be formed in a variety of shapes. As a result, this can broaden the use of the RFID-bearing flexible material. In addition, the antenna portion 106 formed by the technique A is also preferred from the viewpoint of improving the integrity of the flexible material 102 and the antenna portion 106.

Furthermore, in a case where the flexible material is clothing and a fabric product base (e.g., a carpet, a curtain, a cushion cover, a bedding textile, a tent, a tarp, and a fabric bag), the RFID-bearing flexible material including the antenna portion 106 formed by the technique A can be used as clothing and a fabric product base as is.

In addition, the RFID-bearing flexible material 100 of the present embodiment can also be used by attaching it to various articles. The RFID-bearing flexible material 100 of the present embodiment is excellent in flexibility and thus can conform to the shapes of various articles when attached to the article. This allows the RFID-bearing flexible material 100 to be relatively easily attached to an article having, for example, a curved surface. In this use aspect, the RFID-bearing flexible material 100 is preferably removably attached to an article, and the flexible material 102 in the RFID-bearing flexible material 100 preferably includes an adhesive layer that removably adheres to an article. The RFID-bearing flexible material removably attached to an article will be described in detail in a third embodiment and a third embodiment A.

Furthermore, the conductive linear body 104 used in the present embodiment is excellent in flexibility, has corrosion resistance, and contains a CNT yarn that is resistant to chemical change with water. Thus, when the flexible material 102 is a washable material (e.g., such as a woven fabric and a knitted fabric), the conductive linear body 104 is less likely to have change in the electrical resistance in washing.

Thus, the RFID-bearing flexible material 100 of the present embodiment is also excellent in washing resistance.

Next, a structure of the RFID-bearing flexible material 100 of the present embodiment will be described.

Conductive Linear Body

In the present embodiment, the conductive linear body 104 contains a CNT yarn.

The content of the CNT yarn relative to the entire conductive linear body 104 is preferably 20 mass % or greater, more preferably 40 mass % or greater, and even more preferably 60 mass % or greater. In addition, the content of the CNT yarn relative to the total mass of the conductive linear body 104 may be 70 mass % or greater, 90 mass % or greater, 95 mass % or greater, or 100 mass %.

With the content of the CNT yarn relative to the total mass of the conductive linear body 104 of 20 mass % or greater, the conductive linear body 104 has a sufficient conductivity to function as an antenna.

CNT Yarn

The CNT yarn included in the conductive linear body 104 is preferably a yarn bundle of a plurality of CNT yarns bundled together or a single CNT yarn from the viewpoint of exhibiting flexibility.

When the CNT yarn contained in the conductive linear body 104 is a single CNT yarn, the diameter of the single CNT yarn is preferably from 5 μm to 100 μm, more preferably from 7 μm to 75 μm, and even more preferably from 10 μm to 50 μm.

With the diameter of the single CNT yarn of 5 μm or greater, the conductive linear body 104 is likely to have sufficient strength. With the diameter of the single CNT yarn of 100 μm or smaller, the conductive linear body 104 is likely to have improved flexibility.

Note that when the cross section of the CNT yarn is not circular (e.g., an elliptical shape), the diameter of the CNT yarn is the longest width in the widths of the cross section.

For the conductive linear body 104 containing only a single CNT yarn, the diameter of the conductive linear body 104 is synonymous with the diameter of the single CNT yarn.

The diameter or major axis length of the CNT yarn included in the conductive linear body 104 is measured using a transmission electron microscope (TEM).

For example, when the conductive linear body 104 includes a single CNT yarn, 10 single CNT yarns produced by drawing from a CNT forest are randomly sampled and imaged by TEM. From the resulting image, the length along the major axis in the central portion of each CNT yarn is measured, and the average value is taken as the diameter of the single CNT yarn. Alternatively, 10 conductive linear bodies 104 may be randomly taken out from the RFID-bearing flexible material 100 and imaged by TEM, and from the resulting image, the length along the major axis in the central portion of the CNT yarn contained in each conductive linear body 104 is measured, and the average value may be taken as the diameter of the single CNT yarn.

For example, when the conductive linear body 104 includes a yarn bundle of a plurality of CNT yarns bundled together, 10 yarn bundles of CNT yarns produced by drawing them from a CNT forest are randomly sampled and imaged by TEM. From the resulting image, the major axis length along the major axis in the central portion of each yarn bundle is measured, and the average value is taken as the major axis length of the yarn bundle. Alternatively, 10 conductive linear bodies 104 may be randomly taken out from the RFID-bearing flexible material 100 and imaged by TEM, and from the resulting image, the major axis length along the major axis in the central portion of the yarn bundle of CNT yarns included in each conductive linear body 104 is measured, and the average value may be taken as the major axis length of the yarn bundle. Note that when the CNT yarn is a yarn bundle, the major axis length is a maximum distance between any two points on a contour line of the cross section in a direction orthogonal to the longitudinal axis direction of the yarn bundle.

When the CNT yarn included in the conductive linear body 104 is a yarn bundle of a plurality of CNT yarns bundled together, the major axis length of a cross section of the yarn bundle of CNT yarns orthogonal to the longitudinal axis direction of the yarn bundle of CNT yarns (i.e., a diameter of the yarn bundle) is preferably from 7 μm to 5000 μm, more preferably from 20 μm to 3000 μm, and even more preferably from 50 μm to 1000 μm.

With the major axis length of the cross section of 7 μm or greater, the conductive linear body 104 is likely to have sufficient strength.

With the major axis length of the cross section of 5000 μm or smaller, the conductive linear body 104 is likely to have improved flexibility.

For the conductive linear body 104 containing only a yarn bundle of CNT yarns, the major axis length of the cross section of the conductive linear body 104 is synonymous with the major axis length of the cross section of the yarn bundle of CNT yarns.

Method for Producing CNT Yarn

The single CNT yarn is produced, for example, by drawing a CNT from an end portion of a CNT forest (which is a growth body produced by growing a plurality of CNTs on a substrate to be oriented in a direction perpendicular to the substrate and may be referred to as an "array") into a sheet form, bundling the drawn CNT sheets, and then twisting the bundle of CNTs as necessary. Here, the diameter of the single CNT yarn can be adjusted by changing the width of the CNT sheet drawn from the CNT forest.

Alternatively, the CNT yarn can also be produced by other methods, such as spinning of CNT dispersion. The production of the CNT yarn by spinning can be carried out, for example, by the method disclosed in US 2013/0,251,610 (WO 2012/070537).

When a yarn bundle of CNT yarns is produced, the yarn bundle of CNT yarns can be produced by preparing a plurality of single CNT yarns produced by any of the above methods for producing CNT yarns, and bundling these single CNT yarns. In addition, a yarn bundle (twisted yarn) of CNT yarns can be produced by twisting a plurality of CNT yarns.

Conductive Material

The conductive linear body 104 may further contain a conductive material besides the CNT yarn from the viewpoint of further improving conductivity over the CNT yarn alone. The form and material of the conductive material is not particularly limited. Examples of the form of the conductive material include granular and fibrous forms. The size of the conductive material is preferably selected, as appropriate, according to the purpose.

For example, when the conductive material is in granular form, the granular conductive material may be included in the CNT yarn or may be deposited around the single CNT yarn or the yarn bundle of CNT yarns. In addition, when the conductive material is in fibrous form, the fibrous conductive material may be wound around the single CNT yarn or around the yarn bundle of CNT yarns, or may be twisted with the single CNT yarn or the yarn bundle of CNT yarns.

Examples of the conductive material include carbon materials, metallic materials, and conductive polymers.

Examples of the carbon material include amorphous carbon, graphite, fullerene, graphene, and CNT particles.

Examples of the amorphous carbon include carbon black, activated carbon, hard carbon, soft carbon, mesoporous carbon, and carbon fibers.

Examples of the metal material include copper, silver, and aluminum.

Examples of the conductive polymer include polyacetylene, poly(p-phenylene vinylene), polypyrrole, polythiophene, polyaniline, and poly(p-phenylene sulfide).

One of these conductive materials may be used alone, or two or more of these conductive materials may be used in combination.

When the conductive linear body 104 contains a conductive material other than the CNT yarn, a content of the conductive material other than the CNT yarn relative to the total mass of the conductive linear body 104 is preferably 80 mass % or less, more preferably 60 mass % or less, further preferably 40 mass % or less.

The conductive linear body 104 preferably contains a carbon material as the conductive material. This further facilitates improvement of the conductivity of the conductive linear body 104.

At least a portion of the conductive linear body 104 is preferably coated with a conductive material from the viewpoint of increasing conductivity while maintaining flexibility. In this case, at least a portion of the outer periphery of the CNT yarn is preferably coated with a conductive material (preferably a carbon material).

Resin

The conductive linear body 104 preferably further contains a resin. This can impart sliding property to the conductive linear body 104. As a result, this facilitates improvement of sewing properties in weaving, knitting, embroidering, or sewing the conductive linear body 104 in the flexible material 102 to form the antenna portion 106. Here, sewing properties mean the ease of sewing in carrying out any one or more of weaving, knitting, embroidering, and sewing the conductive linear body in the flexible material.

The resin is not particularly limited, and in terms of processability, the resin is preferably a thermoplastic resin or a curable resin. The curable resin may be a thermosetting resin or an energy beam curable resin, including, for example, an ultraviolet light, a visible energy beam, an infrared light, and an electron beam curable resins.

Thermoplastic Resin

The thermoplastic resin is not particularly limited, and examples of the thermoplastic resin include polyolefin resins, polylactide resins, polyester resins, polyvinyl alcohol resins, polyamide resins, acrylonitrile-butadiene-styrene resins, acrylonitrile-styrene resins, acrylate-styrene-acrylonitrile resins, polycarbonate resins, and polyacetal resins.

Examples of the polyolefin resin include polyethylene resins, polypropylene resins, ethylene-($\alpha$-olefin) copolymer resins, propylene-($\alpha$-olefin) copolymer resins, and cyclic polyolefin resins.

Examples of the polylactide resin include poly L-lactide and poly D-lactide.

Examples of the polyester resin include polyethylene terephthalate resins, polybutylene terephthalate resins, cyclohexanedimethanol-copolymerized polyethylene terephthalate resins, polyethylene naphthalate resins, and polybutylene naphthalate resins.

Examples of the polyimide resin include nylon 6,6, nylon 12, and modified polyamides.

One of these thermoplastic resins may be used alone, or two or more of these thermoplastic resins may be used in combination.

Thermosetting Resin

The thermosetting resin is not particularly limited, and examples of the thermosetting resin include epoxy resins, vinyl ester resins, vinyl ether resins, acrylic resins, methacrylic resins, styrene resins, and phenolic resins.

One of these thermosetting resins may be used alone, or two or more of these thermosetting resins may be used in combination.

Energy Beam Curable Resin

The energy beam curable resin is not particularly limited, and a well-known energy beam curable resin can be used.

Examples of the energy beam curable resin include resins including a group having a reactive double bond in the molecule (e.g., such as an acryloyl group and a methacryloyl group). When an energy beam curable resin is used, the conductive linear body 104 preferably further contains a photopolymerization initiator together with the energy beam curable resin.

At least a portion of the outer periphery of the conductive linear body 104 is preferably coated with a resin in terms of improving the sewing properties of the conductive linear body 104. In this case, at least a portion of the outer periphery of the yarn bundle of CNT yarns or the single CNT yarn is preferably coated with a resin.

Method of Coating Outer Periphery of CNT Yarn with Resin

The method for coating the outer periphery of the CNT yarn (preferably the entire outer periphery) with a resin is not particularly limited, and examples of the method include a method of coating or applying dropwise a solution containing a resin to the outer periphery of the CNT yarn, a method of immersing the CNT yarn in a solution containing a resin, and a method of spraying a resin to the outer periphery of the CNT yarn by a spray drying method.

In addition, in the "method for producing CNT yarn" described above, a method of applying dropwise a solution containing a resin to the CNT and a method of spraying a resin to the CNT by a spray drying method can coat the outer periphery of the CNT yarn with a resin in any of: drawing a CNT from an end portion of a CNT forest into a sheet form; bundling the drawn CNT sheets; or twisting the bundle of CNTs.

Furthermore, in view of the compatibility of the CNT yarn and the resin, preferably, a resin (hereinafter, also referred to as a resin X) having a good compatibility with both of the CNT yarn and the resin is prepared, and the resin X is applied to the CNT yarn in advance, and then the "method for coating the outer periphery of the CNT yarn with a resin" described above is carried out.

Examples of the aspect of coating the outer periphery of the CNT yarn with a resin include an aspect in which at least a portion of the outer periphery of the yarn bundle of CNT yarns or the single CNT yarn is coated with a resin and an aspect in which a strand-like resin is wound around at least a portion of the outer periphery of the yarn bundle of CNT yarns or the single CNT yarn.

The conductive linear body 104 is preferably twisted in terms of improving handling properties.

Figure 18:
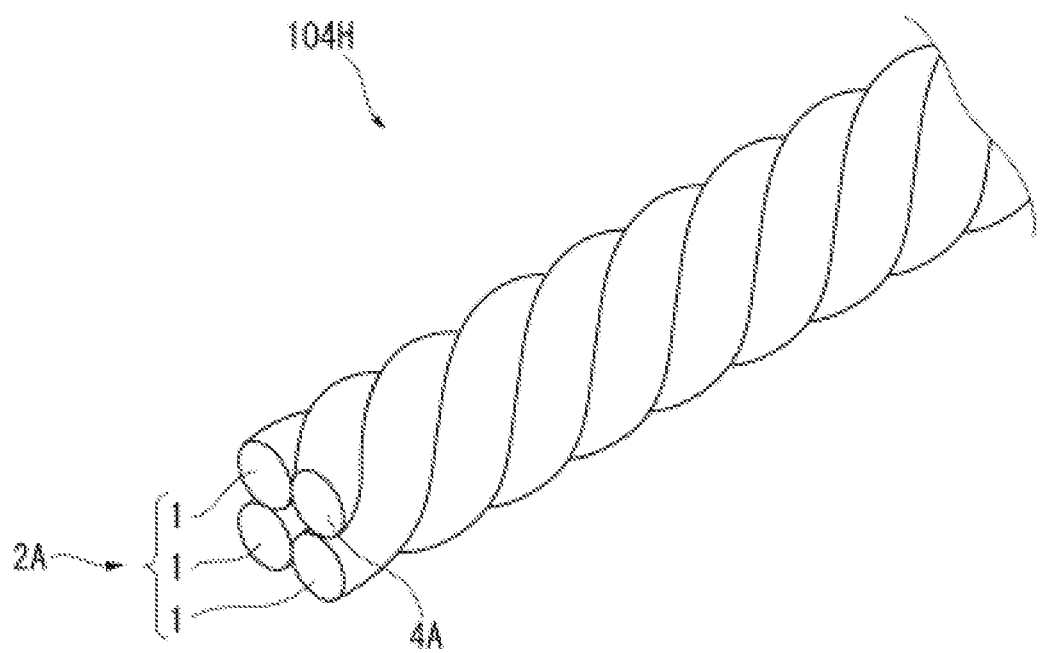
FIG. 18 is a diagram illustrating a strand-like resin and a yarn bundle of CNT yarns are twisted together.

Examples of the aspect in which the conductive linear body 104 is twisted includes an aspect in which a single CNT yarn is twisted, an aspect in which a plurality of CNT yarns are twisted together, an aspect in which a strand-like resin and a yarn bundle of CNT yarns or a single CNT yarn are twisted together (FIG. 18 is a diagram illustrating a strand-like resin 4A and a yarn bundle 2A of CNT yarns are twisted together as a conductive linear body 104H), an aspect in which a conductive yarn other than a CNT yarn (e.g., such as a carbon fiber and a conductive polymer fiber) and a yarn bundle of CNT yarns or a single CNT yarn are twisted together, and an aspect in which a strand-like resin, the conductive yarn, and a yarn bundle of CNT yarns or a single CNT yarn are twisted together.

In the aspect in which the conductive linear body 104 is twisted, the numbers of the CNT yarn, the strand-like resin, and the conductive yarn are selected depending on the purpose.

Among them, in terms of improving the sewing properties of the conductive linear body 104, preferably, a strand-like resin and a yarn bundle of CNTs or a single CNT yarn are twisted together.

The content of the resin relative to the total mass of the conductive linear body 104 is preferably from 0.1 mass % to 80 mass %, more preferably from 0.1 mass % to 60 mass %, and even more preferably from 0.1 mass % to 40 mass %.

With the content of the resin of from 0.1 mass % to 80 mass %, the conductive linear body 104 can have improved sewing properties while maintaining the flexibility. In addition, the corrosion resistance of the conductive linear body 104 can be improved.

The linear resistance of the conductive linear body 104 is preferably from $5.0 \times 10^{-3}$ Ω/cm to $1.0 \times 10^{3}$ Ω/cm and more preferably from $1.0 \times 10^{-2}$ Ω/cm to $5.0 \times 10^{2}$ Ω/cm.

Details of the method for measuring the linear resistance of the conductive linear body 104 will be described in the Examples section.

The conductive linear body 104 may contain an additional component other than the CNT yarn, the above conductive material, and the above resin.

Examples of the additional component include additives, organic fillers, inorganic fillers, and resins other than the above resin. Examples of the additive include antioxidants, ultraviolet absorbers, flame retardants, plasticizers, cross-linkers, softeners, surface conditioners, heat stabilizers, and colorants.

The content of the additional component relative to the entire conductive linear body 104 is not particularly limited and may be any amount that does not impair the flexibility and corrosion resistance of the conductive linear body 104 but is preferably from 0 mass % to 10 mass %.

The additional component may be included in any of the CNT yarn, the conductive material, and the resin.

For the CNT yarn containing an additional component, the content of the additional component relative to the total mass of the single CNT yarn or the entire yarn bundle of CNT yarns is preferably from 0 mass % to 10 mass %.

Aspect of Conductive Linear Body

An example of an aspect of the conductive linear body 104 includes the following aspects A to G. These aspects will be described with reference to the drawings. Note that the same reference sign represents the same member, and thus the description of the same member will be omitted.

Aspect A

Figure 2:
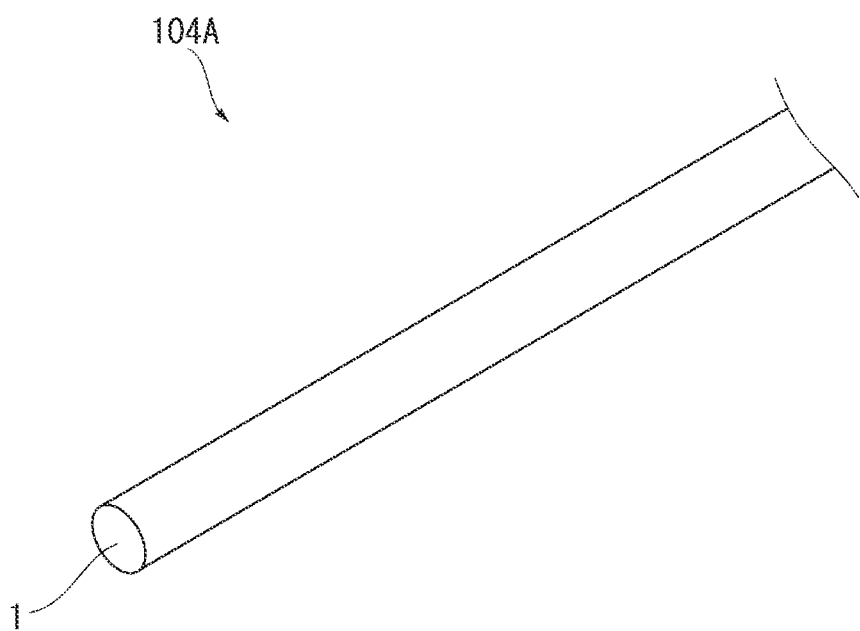
FIG. 2 is a perspective view of a conductive linear body according to aspect A.

FIG. 2 is a perspective view of a conductive linear body 104A according to aspect A.

The conductive linear body 104A is constituted of only a single CNT yarn 1.

Aspect B

Figure 3:
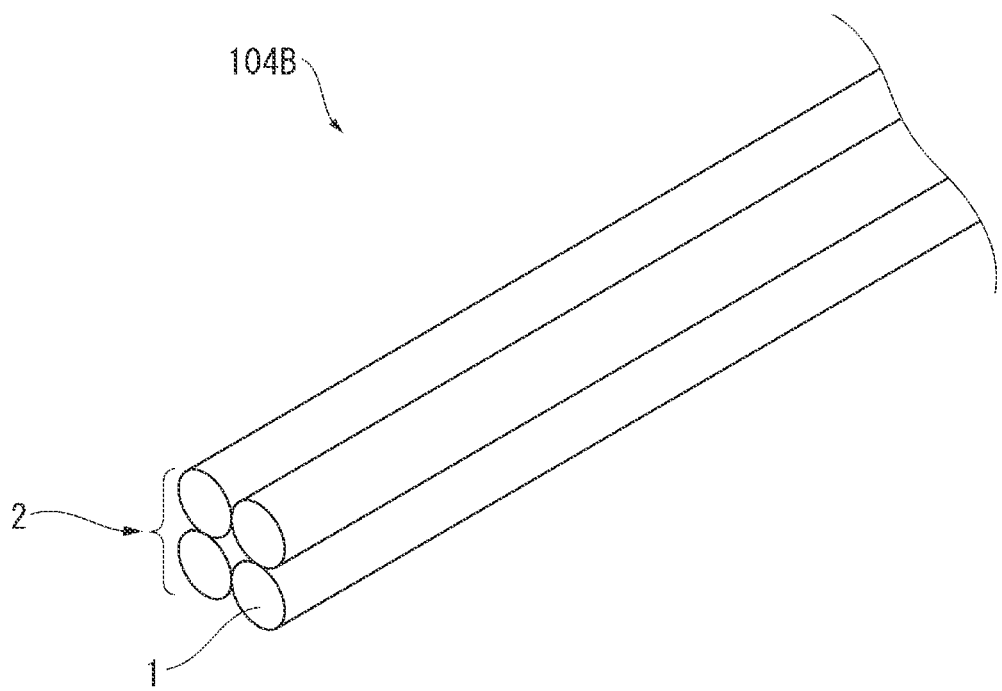
FIG. 3 is a perspective view of a conductive linear body according to aspect B.

FIG. 3 is a perspective view of a conductive linear body 104E according to aspect B.

The conductive linear body 104B is constituted of only a yarn bundle 2 of four CNT yarns 1 bundled together.

Aspect C

Figure 4:
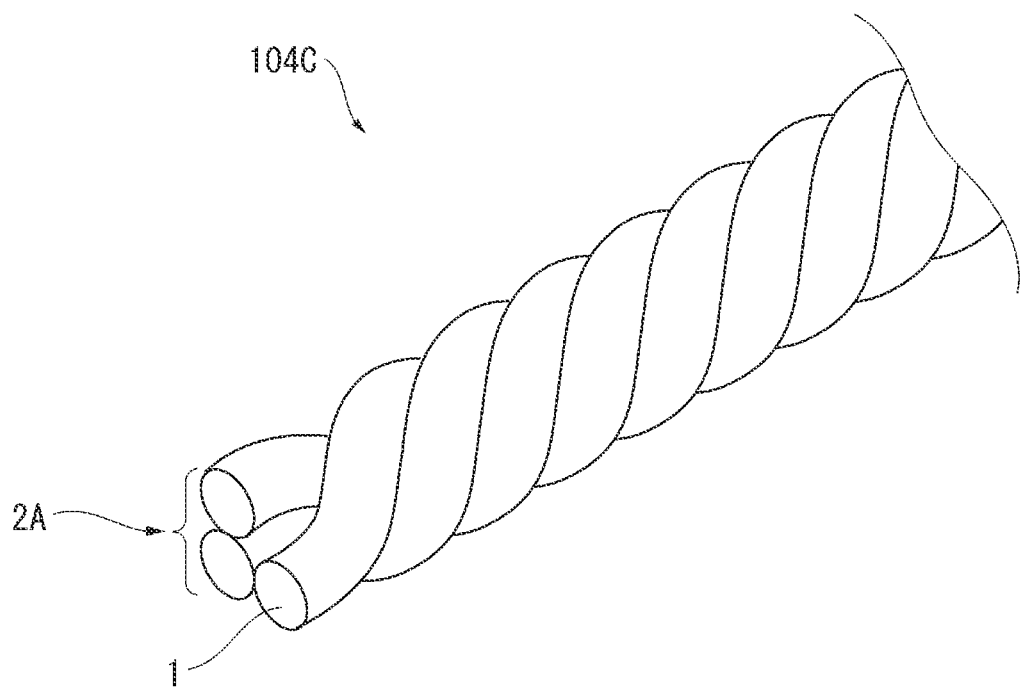
FIG. 4 is a perspective view of a conductive linear body according to aspect C.

FIG. 4 is a perspective view of a conductive linear body 104C according to aspect C.

The conductive linear body 1040 is constituted of only a yarn bundle 2A (twisted yarn) of three CNT yarns 1 twisted together.

Aspect D

Figure 5:
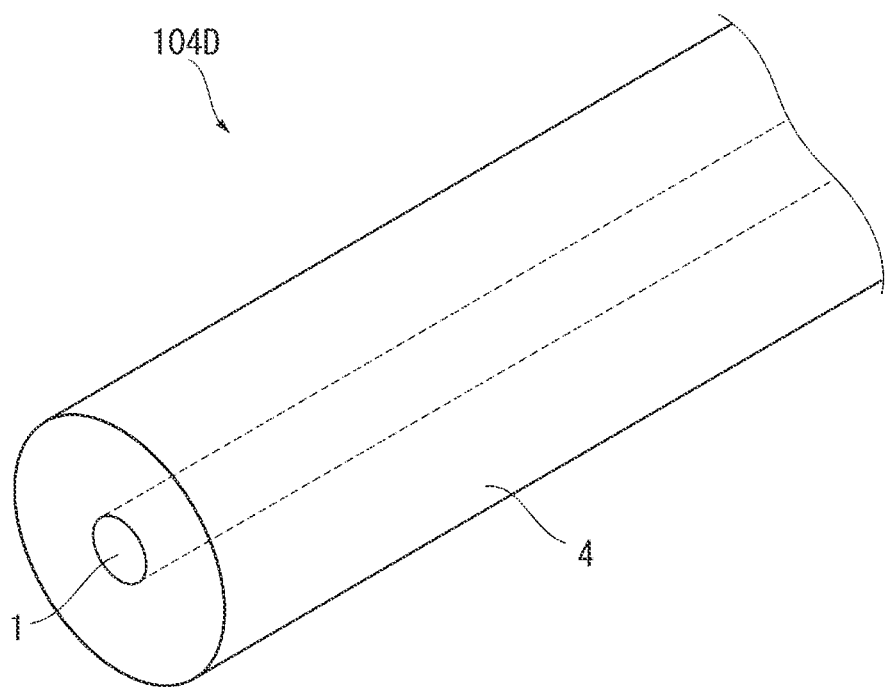
FIG. 5 is a perspective view of a conductive linear body according to aspect D.

FIG. 5 is a perspective view of a conductive linear body 104D according to aspect D.

The conductive linear body 104D is constituted of a single CNT yarn 1 and a resin 4.

The conductive linear body 104D is coated with the resin 4 on the outer periphery of the single CNT yarn 1.

Aspect E

Figure 6:
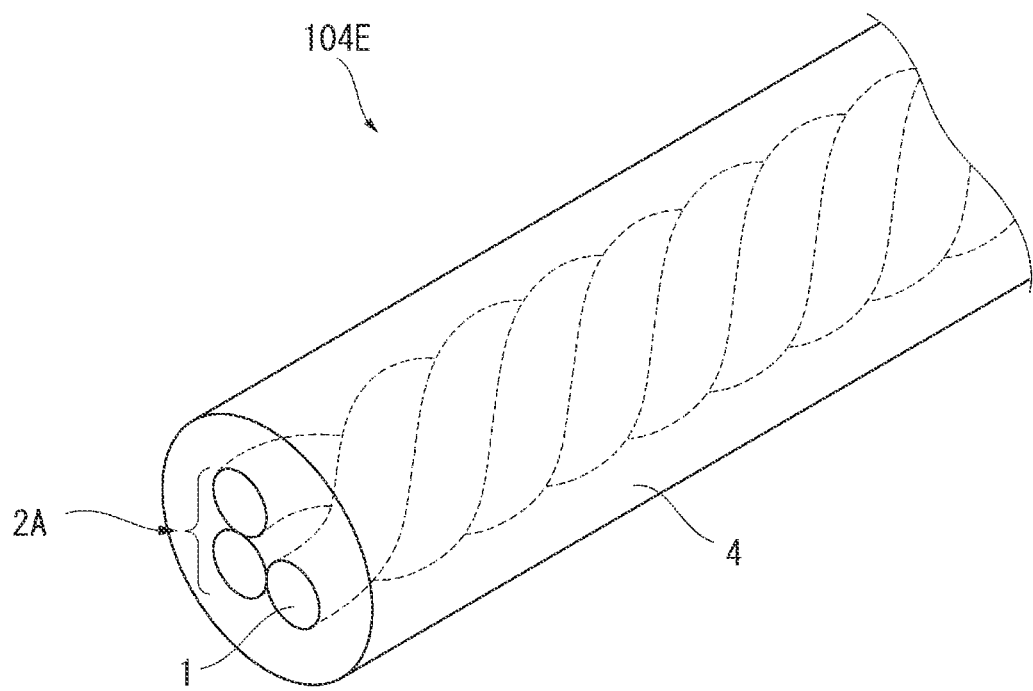
FIG. 6 is a perspective view of a conductive linear body according to aspect E.

FIG. 6 is a perspective view of a conductive linear body 104E according to aspect E.

The conductive linear body 104E is constituted of a yarn bundle 2A (twisted yarn) of three CNT yarns 1 twisted together and a resin 4.

The conductive linear body 104E is coated with the resin 4 on the outer periphery of the yarn bundle 2A (twisted yarn).

Aspect F

Figure 7:
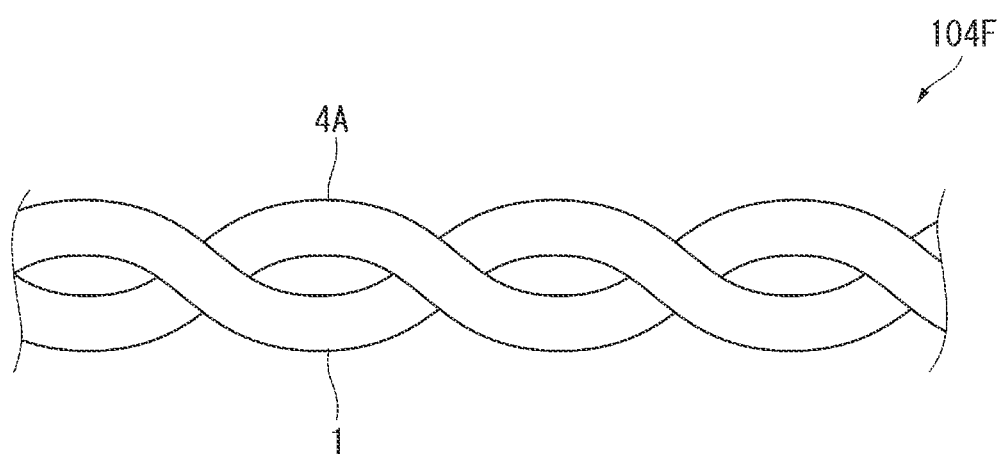
FIG. 7 is a side view of a conductive linear body according to aspect F.

FIG. 7 is a side view of a conductive linear body 104F according to aspect F.

In the conductive linear body 104F, a single CNT yarn 1 and a single strand-like resin 4A are twisted together.

Aspect G

Figure 8:
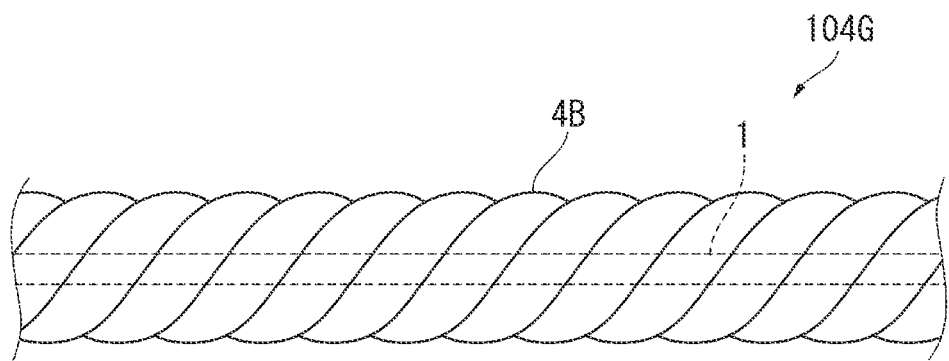
FIG. 8 is a side view of a conductive linear body according to aspect G.

FIG. 8 is a side view of a conductive linear body 104G according to aspect G.

In the conductive linear body 104G, a single strand-like resin 4B is spirally wound around the outer periphery of a single CNT yarn 1 in one direction.

Method for Producing RFID-Bearing Flexible Material of First Embodiment

In the first embodiment, when the conductive linear body 104 is constituted of only a single CNT yarn (the conductive linear body 104A according to the aspect A), the RFID-bearing flexible material 100 is produced as follows.

First, a CNT yarn is prepared as the conductive linear body 104. The CNT yarn may be produced by the method described above or may be a commercially available product. Next, the prepared single CNT yarn is woven in a woven fabric serving as the flexible material 102 in an antenna shape illustrated in FIG. 1, and the antenna portion 106 is formed. The RFID-bearing flexible material 100 is producible by the same method even using the conductive linear bodies 104B to 104E according to the respective aspects B to G instead of the conductive linear body 104A according to the aspect A.

Second Embodiment

A second embodiment of the present invention will be described, focusing on differences from the first embodiment, and descriptions of similar items will be omitted or simplified, for example, by representation with the same reference sign.

An RFID-bearing flexible material 200 according to the second embodiment is the same as the RFID-bearing flexible material 100 according to the first embodiment with the exception that a knitted fabric is used as the flexible material instead of the woven fabric, and the antenna portion has a different pattern.

Figure 9:
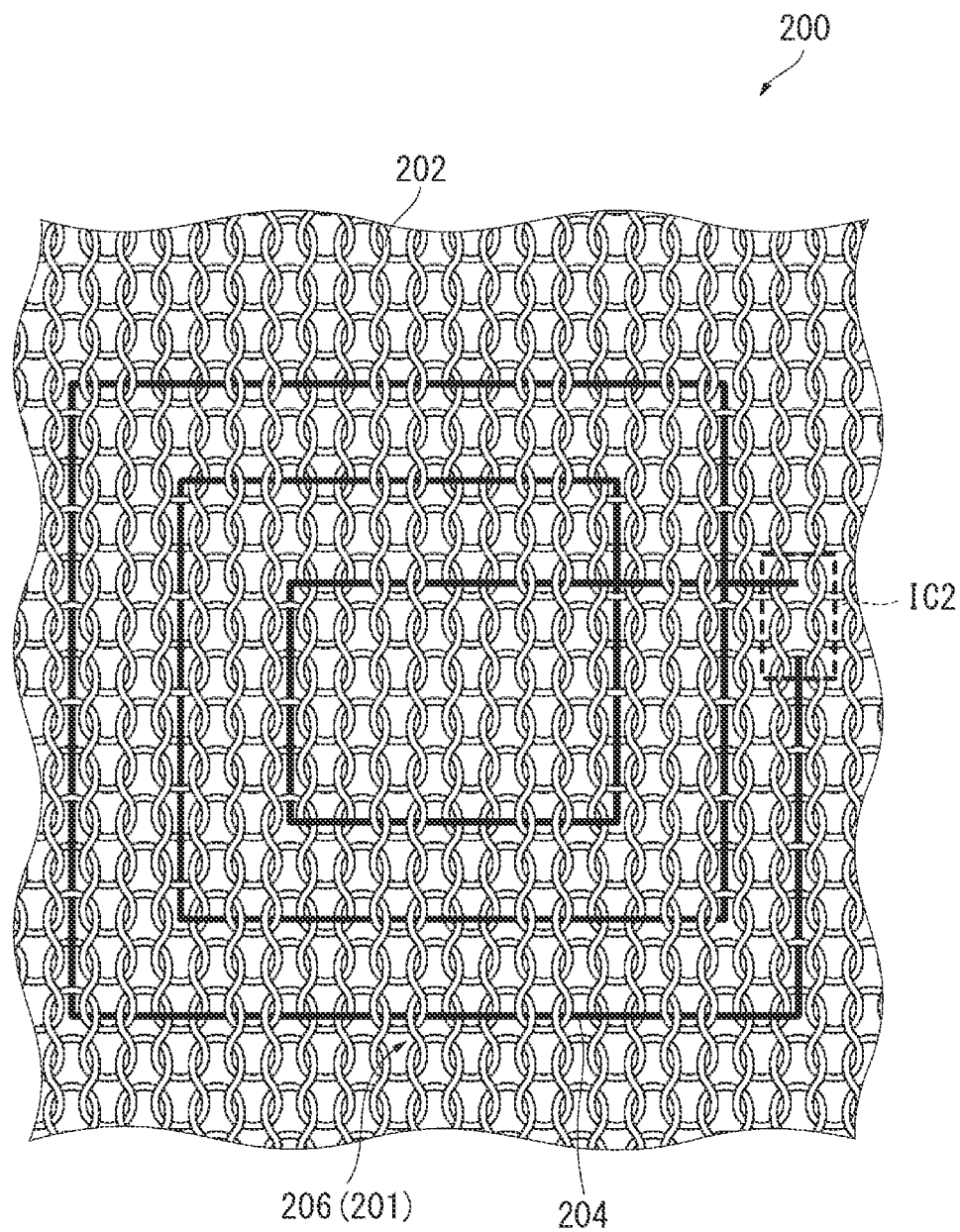
FIG. 9 is a plan view of an RFID-bearing flexible material according to a second embodiment.

FIG. 9 is a plan view of the RFID-bearing flexible material 200 according to the second embodiment.

An RFID 201 is attached to the RFID-bearing flexible material 200. A conductive linear body 204 contains a CNT yarn.

In the second embodiment, a flexible material 202 is a knitted fabric, and the RFID 201 includes an antenna portion 206. FIG. 9 illustrates the antenna portion 206 having a spiral pattern (spiral antenna). The antenna portion 206 (spiral antenna) is formed by knitting the conductive linear body 204 containing a CNT yarn in a knitted fabric serving as the flexible material 202. As the conductive linear body 204, for example, one of the conductive linear bodies 104A to 104G of the aspects A to G can be used alone, or two or more thereof can be used in combination.

In addition, examples of the knitted fabric include fabrics produced by weft knitting, warp knitting, lace knitting, parallel knitting, plating knitting, inlay knitting, and well-known applied knitting.

The RFID-bearing flexible material 200 functions as an RFID tag, for example, by attaching an IC chip to a dotted region IC2 illustrated in FIG. 9. Here, in FIG. 9, a portion where parts of the conductive linear body 204 intersect is constituted of a non-conductive member (not illustrated), and thus the conductive linear body 204 is not in contact with itself.

The second embodiment achieves an RFID-bearing flexible material 200 excellent in flexibility and having corrosion resistance.

The RFID-bearing flexible material 200 of the second embodiment can be used by attaching it to various articles. For example, when the flexible material 202 is clothing, the RFID-bearing flexible material 200 can be used as closing as is.

Method for Producing RFID-Bearing Flexible Material of Second Embodiment

In the second embodiment, when the conductive linear body 204 is constituted of only a single CNT yarn, the RFID-bearing flexible material 200 is produced by knitting a prepared single CNT yarn in a knitted fabric serving as the flexible material 202 in an antenna shape illustrated in FIG. 9 to form the antenna portion 206.

Third Embodiment

A third embodiment of the present invention will be described, focusing on differences from the first embodiment, and descriptions of similar items will be omitted or simplified, for example, by representation with the same reference sign.

In the third embodiment, an RFID-bearing flexible material that can be removably attached to an article will be described. An RFID-bearing flexible material 300 according to the third embodiment is the same as the RFID-bearing flexible material 100 according to the first embodiment with the exception that an adhesive sheet including a flexible substrate is used as the flexible material instead of the woven fabric, the RFID-bearing flexible material includes an adhesive layer that can be removably attached to an article, and the antenna portion has a different pattern.

Figure 10:
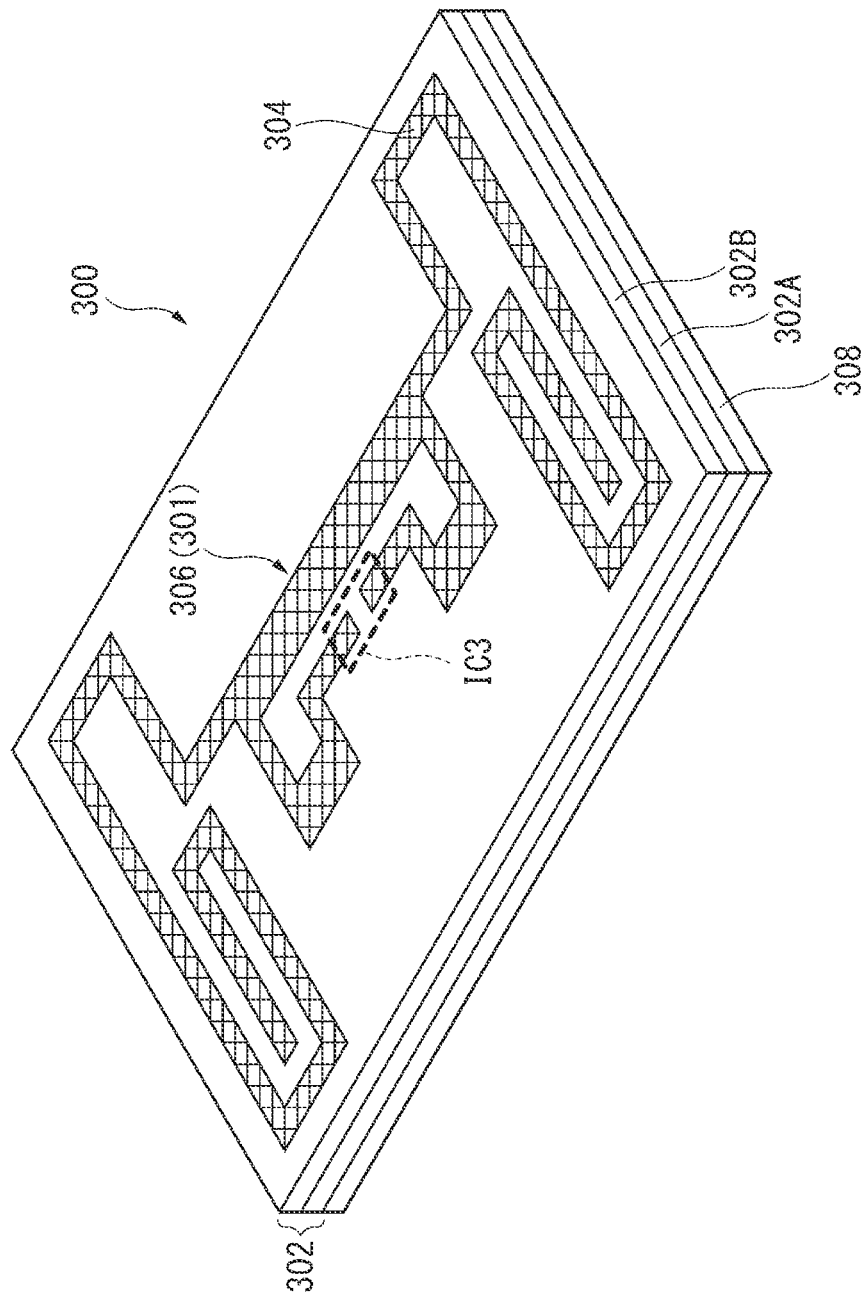
FIG. 10 is a perspective view of an RFID-bearing flexible material according to a third embodiment.

FIG. 10 is a plan view of the RFID-bearing flexible material 300 according to the third embodiment.

An RFID 301 is attached to the RFID-bearing flexible material 300. A conductive linear body 304 contains a CNT yarn.

In the third embodiment, a flexible material 302 is an adhesive sheet having flexibility, and the RFID 301 includes an antenna portion 306. In addition, the adhesive sheet as the flexible material 302 includes an adhesive layer 302A and a flexible substrate 302B. Furthermore, the RFID-bearing flexible material 300 includes a release layer 308 on the surface of the adhesive layer 302A opposite to the flexible substrate 302B.

FIG. 10 illustrates the antenna portion 306 having a specific pattern. The antenna portion 306 is formed by embroidering the conductive linear body 304 containing a CIT yarn with a cross stitch in the adhesive sheet. As the conductive linear body 304, for example, one of the conductive linear bodies 104A to 104G of the aspects A to G can be used alone, or two or more thereof can be used in combination. In addition, the conductive linear body 304 may be embedded in the flexible substrate 302B.

Furthermore, examples of the embroidery technique include cross stitch, running stitch, couching stitch, back stitch, chain stitch, and outline stitch. FIG. 10 illustrates an example in which the antenna portion 306 is embroidered using cross stitch.

The RFID-bearing flexible material 300 functions as an RFID tag, for example, by attaching an IC chip to a dotted region IC3 illustrated in FIG. 10.

Adhesive Sheet

The adhesive sheet includes the adhesive layer 302A and the flexible substrate 302B. The flexible substrate 302B is a member for supporting the adhesive layer 302A.

Adhesive Layer

The adhesive layer 302A is preferably formed from an adhesive composition containing an adhesive resin from the viewpoint of processability and handling properties. The form of the adhesive composition is not particularly limited and may be in any form of, for example, a solvent adhesive composition, an emulsion adhesive composition, a hot melt adhesive composition, and a heat-sensitive adhesive composition. Here, the "hot melt adhesive" refers to an adhesive that can be spread-coated upon melting by heating and exhibits adhesion and cohesive force by cooling. The "heat sensitive adhesive" refers to an adhesive having relatively low adhesive force at room temperature (25° C.) and having high bonding force by heating to a temperature exceeding room temperature (25° C.) or higher (e.g., from 60° C. to 80° C.).

Examples of the adhesive resin include acrylic resins, urethane resins, rubber resins, olefin resins, silicone resins, and energy beam curable resins including a polymerizable functional group in these resins. In addition, for the adhesive layer 302A formed from a heat-sensitive adhesive composition, examples of the adhesive resin included in the heat-sensitive adhesive composition include polyester urethane resins, polyester resins, acrylic resins, vinyl acetate resins, polyurethane resins, and rubber resins. These adhesive resins may be used alone or in combination of two or more.

In addition, the adhesive composition, which is a material for forming the adhesive layer 302A, may contain an additive for adhesives according to the type of the adhesive resin or the use of the adhesive sheet.

Examples of the additive for adhesives include cross-linking agents, tackifiers, fillers, antioxidants, thermal stabilizers, ultraviolet absorbers, light stabilizers, colorants, flame retardants, thickeners, antistatic agents, polymerization initiators, and curing auxiliary agent.

For example, for the adhesive layer 302A formed from a hot melt adhesive composition, a hot melt adhesive composition containing a block copolymer, a tackifier, and a plasticizer in predetermined ratios can be used.

Examples of the block copolymer include AB diblock copolymers, such as styrene-isobutylene block copolymers (SIB), styrene-butadiene block copolymers (SB), and styrene-isoprene block copolymers (SI); and ABA triblock copolymers, such as styrene-isobutylene-styrene block copolymers (SIBS), styrene-butadiene-styrene block copolymers (SBS), and styrene-isoprene-styrene block copolymers (SIS). One of these block copolymers may be used alone, or two or more of these block copolymers may be used in combination.

The tackifier and the plasticizer are not particularly limited, and a tackifier and a plasticizer well-known in the art can be used.

The adhesive layer 302A is also preferably a pseudo-bonding layer. The pseudo-bonding layer has a function of bringing the adhesive sheet and an adherend into a pseudo-bonded state. Here, the pseudo-bonded state means a state where the adhesive sheet and the adherend are bonded in a normal use state, but in peeling the adhesive sheet from the adherend, the adhesive sheet is peeled off simply by manually pulling it without using a special tool or the like, and the adhesive sheet and the adherend cannot be re-bonded only by simply overlaying and pressing them. The pseudo-bonded state differs from adhesion with a normal adhesive in that "the state where the adhesive sheet and the adherend cannot be re-bonded only by simply overlaying and pressing them".

Examples of the pseudo-bonding layer include a heat seal layer formed from a thermoplastic resin.

The heat seal layer formed from a thermoplastic resin is a layer having heat sealability, where the layer contains a thermoplastic resin as a main component. The main component refers to a component having the highest content ratio (mass %) in the heat seal layer.

Examples of the thermoplastic resin used for forming the heat seal layer include polyethylenes, polystyrenes, acrylic resins, natural rubber resins, vinyl chloride-vinyl acetate copolymers, ethylene-vinyl acetate copolymers, and ultraviolet-curable yarnish. Among them, the thermoplastic resin used for forming the heat seal layer is preferably a polyethylene.

An adhesive sheet using a "heat seal layer formed from a thermoplastic resin" as the adhesive layer 302A can be produced, for example, as follows.

A composition containing a thermoplastic resin for forming a heat seal layer is heat-melted and extruded into a film shape through an extruder, and the surface of the flexible substrate 302B is brought into contact with one surface of this film.

The thickness of the adhesive layer 302A is selected according to the use and is preferably from 1 μm to 500 μm, more preferably from 5 μm to 300 μm, and even more preferably from 10 μm to 100 μm.

Flexible Substrate

Examples that can be used as the flexible substrate 302B include sheet materials, such as synthetic resin films; paper; nonwoven fabrics; and fabrics.

Examples of the synthetic resin film include polyethylene films, polypropylene films, polybutene films, polybutadiene films, polymethylpentene films, polyvinyl chloride films, vinyl chloride copolymer films, polyethylene terephthalate films, polyethylene naphthalate films, polybutylene terephthalate films, polyurethane films, ethylene vinyl acetate copolymer films, ionomer resin films, ethylene-(meth)acrylate copolymer films, ethylene-(meth)acrylate copolymer films, polystyrene films, polycarbonate films, and polyimide films. Additionally, examples of the flexible substrate 302B include crosslinked films and laminated films of the above films.

In addition, examples of the paper include high-quality paper, recycled paper, and kraft paper. Examples of the nonwoven fabric include spunbond nonwoven fabrics, needle-punched nonwoven fabrics, melt-blown nonwoven fabrics, and spunlace nonwoven fabrics. Examples of the fabric include woven fabrics and knitted fabrics. The paper, the nonwoven fabric, and the fabric as the flexible substrate 302B are not limited to these examples.

The thickness of the flexible substrate 302B is not particularly limited. The thickness of the flexible substrate is preferably from 10 μm to 500 μm, more preferably from 15 μm to 300 μm, and even from 20 μm to 250 μm.

Release Layer

The release layer 308 is provided as necessary on the surface of the adhesive layer 302A opposite to the flexible substrate 302B. The release layer 308 is not particularly limited. For example, in terms of ease of handling, the release layer 308 preferably includes a release substrate and a release agent layer formed by applying a release agent onto the release substrate. In addition, the release layer 308 may include the release agent layer on only one side of the release substrate or may include release agent layers on both sides of the release substrate.

Examples of the release substrate include paper substrates, laminated paper made by laminating a thermoplastic resin (e.g., such as polyethylene) on a paper substrate or the like, and plastic films. Examples of the paper substrate include glassine paper, coated paper, and cast coated paper. Examples of the plastic film include polyester films (e.g., such as polyethylene terephthalate, polybutylene terephthalate, and polyethylene naphthalate) and polyolefin films (e.g., such as polypropylene and polyethylene). Examples of the release agent include olefin resins, rubber elastomers (e.g., such as butadiene resins and isoprene resins), long-chain alkyl resins, alkyd-based resins, fluorine-based resins, and silicone resins.

The thickness of the release layer 308 is not particularly limited. The thickness of the release layer 308 is preferably from 20 μm to 200 μm and more preferably from 25 μm to 150 μm.

The thickness of the release agent layer of the release layer 308 is not particularly limited. A release agent layer formed by applying a solution containing a release agent has a thickness of preferably from 0.01 μm to 2.0 μm and more preferably from 0.03 μm to 1.0 μm.

The third embodiment achieves an RFC-bearing flexible material 300 excellent in flexibility and having corrosion resistance.

The flexible material 302 is an adhesive sheet including the adhesive layer 302A and the flexible substrate 302B, thus the RFID-bearing flexible material 300 can be removably and easily attached to an article. In addition, the RFID-bearing flexible material 300 including the adhesive layer 302A containing a hot melt adhesive can be easily removed from the article by remelting the hot melt adhesive.

This facilitates actions, for example, in such cases as where a period for carrying out wireless communication is scheduled in advance, where conditions for wireless communication have been changed, and where the RFID-bearing flexible material 300 is required to be replaced.

Method for Producing RFID-Bearing Flexible Material of Third Embodiment

In the third embodiment, when the conductive linear body 304 is constituted of only a single CNT yarn, the RFID-bearing flexible material 300 is produced as follows, for example.

First, a prepared single CNT yarn is embroidered in an antenna shape illustrated in FIG. 10 in the flexible substrate 302B, and the antenna portion 306 is formed. Next, the adhesive layer 302A and, as necessary, the release layer 308 are formed by a well-known method on the surface of the flexible substrate 302B opposite to the surface where the antenna portion 306 is formed. FIG. 10 illustrates an example in which the antenna portion 306 is embroidered using cross stitch.

Use Aspect of RFID-Bearing Flexible Material of Third Embodiment

Figure 11:
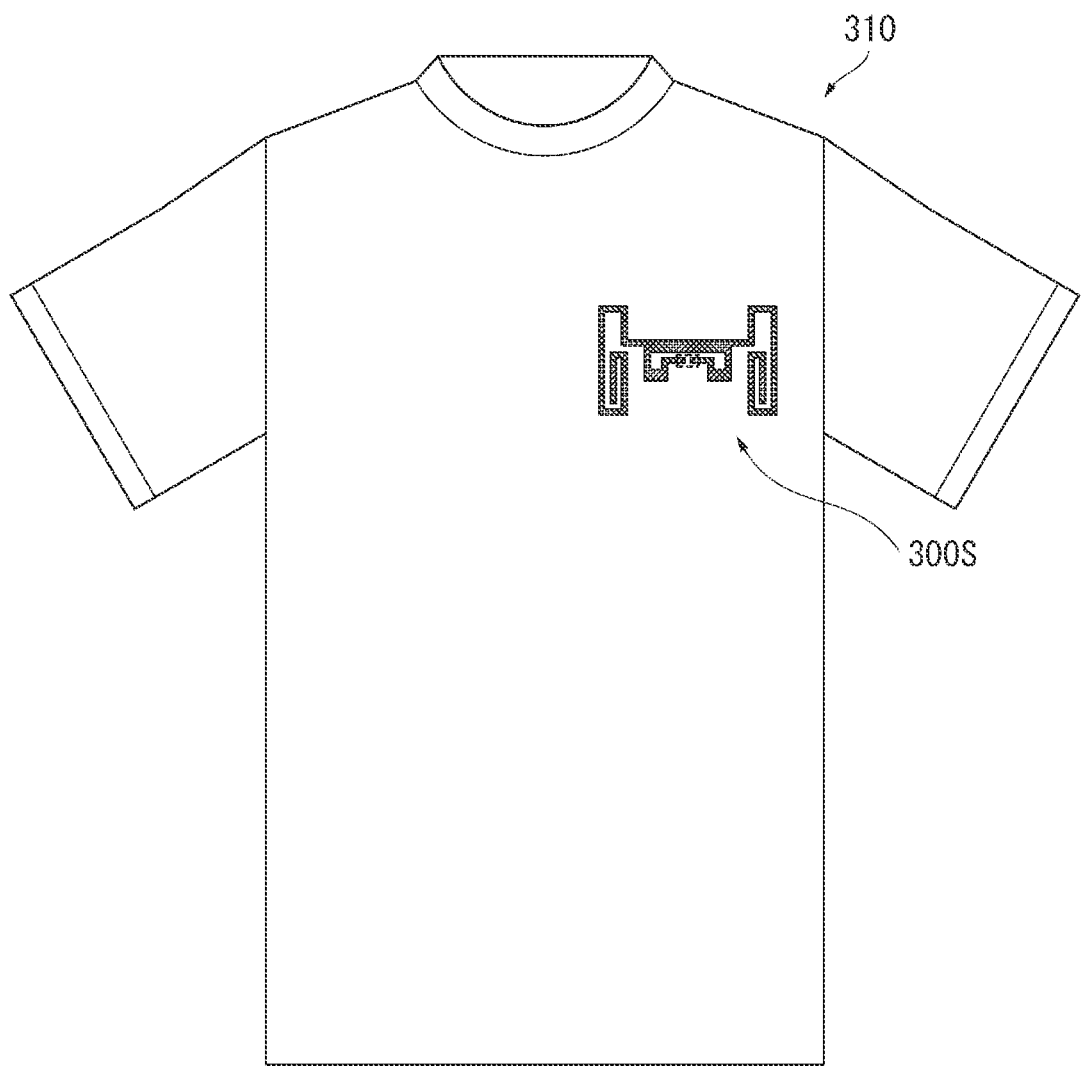
FIG. 11 is a diagram illustrating an example of a use aspect of an RFID-bearing flexible material according to a third embodiment.

FIG. 11 is an example of a use aspect of the RFID-bearing flexible material of the third embodiment.

Hereinafter, the RFID-bearing flexible material in the state after the release layer 308 is peeled off from the RFID-bearing flexible material 300 of the third embodiment is referred to as an RFID-bearing adhesive sheet 300S.

FIG. 11 illustrates a state where the RFID-bearing adhesive sheet 300S is attached to the left chest part of a T-shirt 310. The RFID-bearing adhesive sheet 300S is attached to the left chest part of the T-shirt 310, for example, by a method (1) or (2).

(1) When the adhesive layer 302A is a sticker-type adhesive layer, the surface of the adhesive layer 302A of the RFID-bearing adhesive sheet 300S is directly affixed to the left chest part of the T-shirt 310.

(2) When the adhesive layer 302A is a hot melt adhesive layer, the surface of the adhesive layer 302A of the RFID-bearing adhesive sheet 300S is overlaid on the left chest part of the T-shirt 310, the adhesive layer 302A is melted with a heating means, such as an iron, and then the hot melt adhesive is solidified. Note that the location where the RFID-bearing adhesive sheet 300S is attached is not limited to the left chest part.

Third Embodiment A

A third embodiment A of the present invention will be described, focusing on differences from the third embodiment, and descriptions of similar items will be omitted or simplified, for example, by representation with the same reference sign.

An RFID-bearing flexible material 500 according to the third embodiment A is the same as the RFID-bearing flexible material 300 according to the third embodiment with the exception that the flexible substrate of the adhesive sheet is a thick denim fabric 502 (an example of a woven fabric), an antenna portion 506 (spiral antenna) having a spiral pattern is formed on this denim fabric 502, and a hot melt adhesive layer 503 is provided on the surface of the denim fabric 502 opposite to the antenna portion 506. Note that the hot melt adhesive layer 503 is formed from the hot melt adhesive composition described in the third embodiment.

Figure 12:
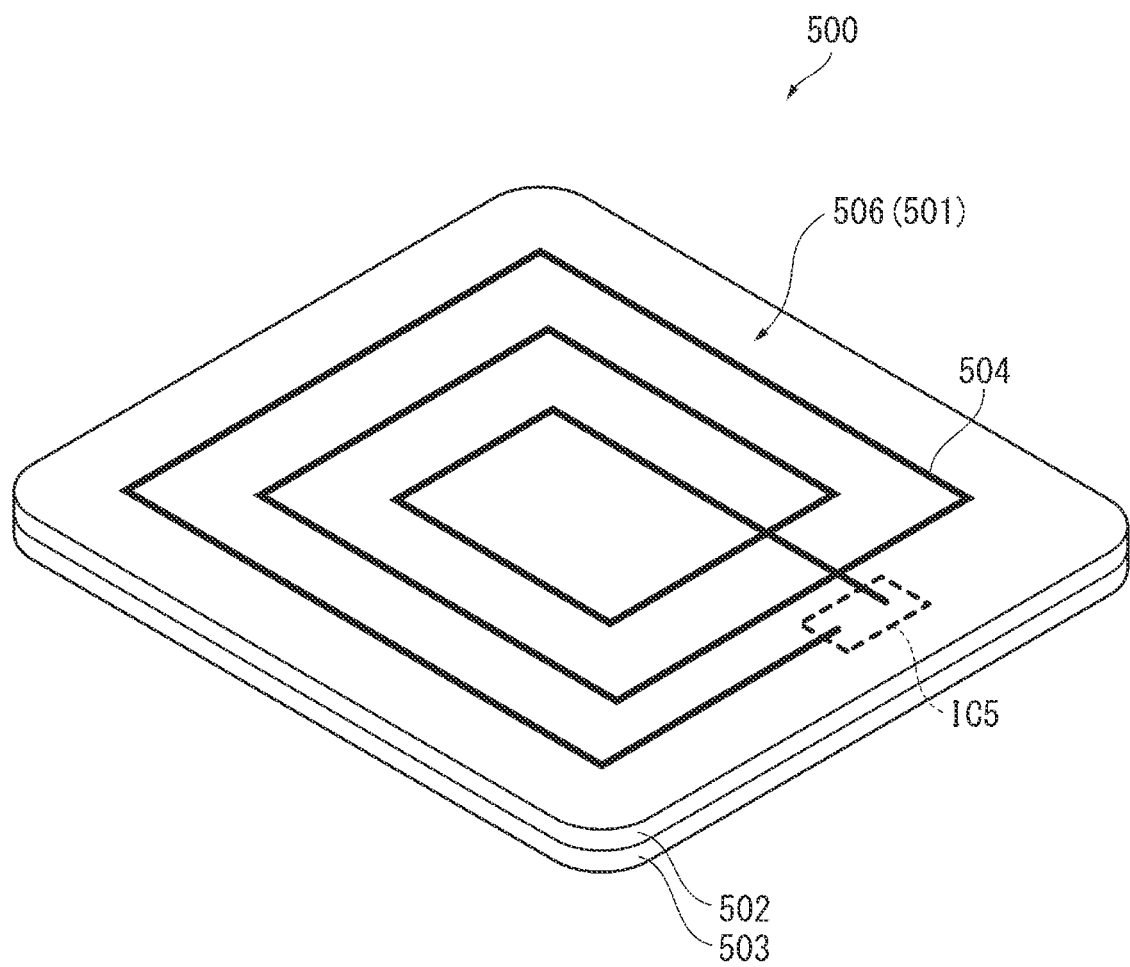
FIG. 12 is a perspective view of an RFID-bearing flexible material according to a third embodiment A.

FIG. 12 is a perspective view of the RFID-bearing flexible material 500 according to the third embodiment A.

An RFID 501 is attached to the RFID-bearing flexible material 500. A conductive linear body 504 contains a CNT yarn.

The antenna portion 506 (spiral antenna) illustrated in FIG. 12 is formed by embroidering the conductive linear body 504 containing a CNT yarn in the denim fabric 502. FIG. 12 illustrates an example in which the antenna portion 506 is embroidered using back stitch as the embroidery technique. As the conductive linear body 504, for example, one of the conductive linear bodies 104A to 104G of the aspects A to G can be used alone, or two or more thereof can be used in combination.

The RFID-bearing flexible material 500 functions as an RFID tag, for example, by attaching an IC chip to a dotted region IC5 illustrated in FIG. 12. Here, in FIG. 12, a portion where parts of the conductive linear body 504 intersect is constituted of a non-conductive member (not illustrated), and thus the conductive linear body 504 is not in contact with itself.

The third embodiment A achieves the same effects as achieved by the third embodiment.

Furthermore, the RFID-bearing flexible material 500 according to the third embodiment A can be suitably used as a patch badge. For example, the RFD-bearing flexible material 500 can be easily attached to an article by overlaying the surface of the adhesive layer 503 with the location for attaching on the article, such as clothing, a hat, and a bag, and melting the adhesive layer 503 with a heating means, such as an iron.

This can impart RFID functionality to the article and improve the design of the article.

Fourth Embodiment

A fourth embodiment of the present invention will be described, focusing on differences from the first embodiment, and descriptions of similar items will be omitted or simplified, for example, by representation with the same reference sig.

The RFID-bearing flexible material according to the fourth embodiment is the same as the RFID-bearing flexible material according to the first embodiment with the exception that a gel sheet is used as the flexible material instead of the woven fabric, and the antenna portion has a different pattern.

Figure 13:
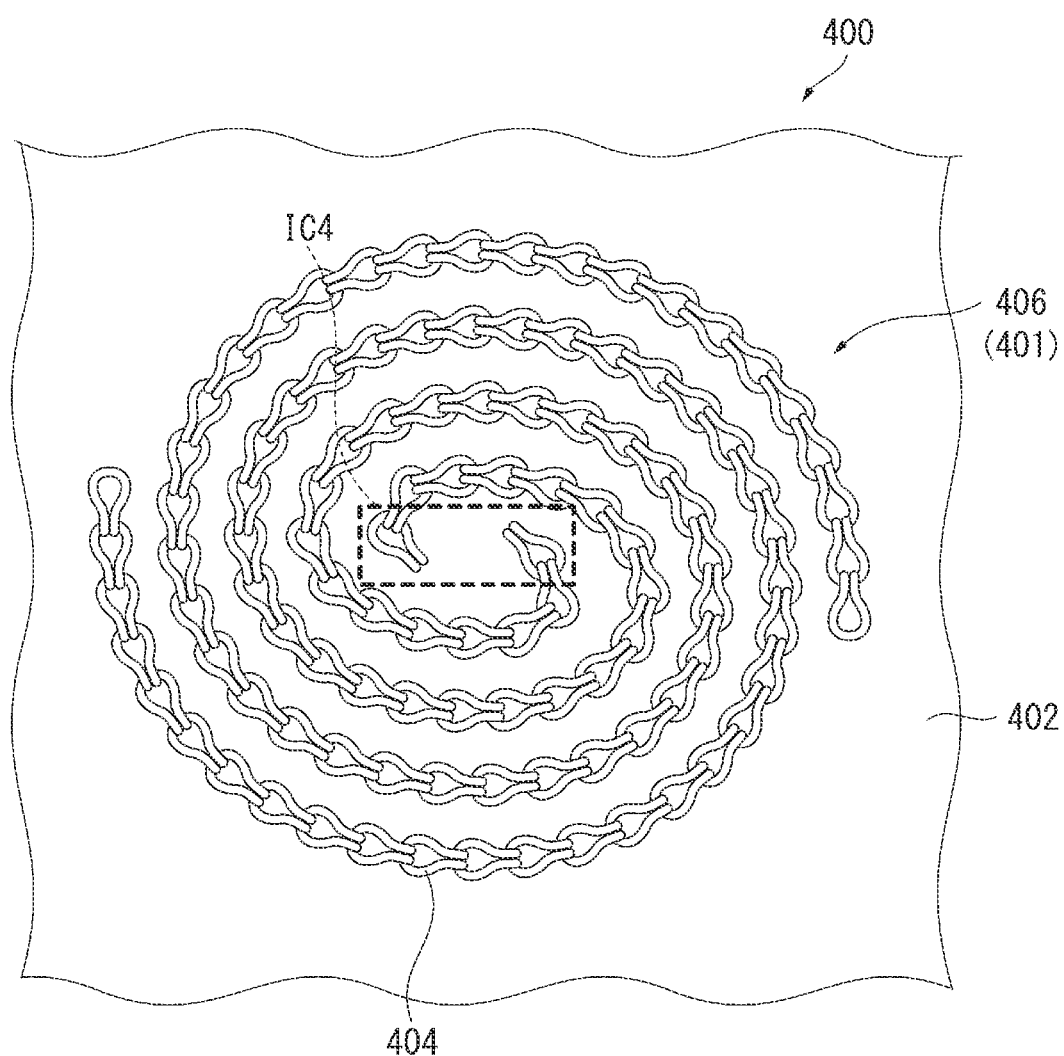
FIG. 13 is a plan view of an RFID-bearing flexible material according to a fourth embodiment.

FIG. 13 is a plan view of the RFID-bearing flexible material 400 according to the fourth embodiment.

An RFID 401 is attached to an RFID-bearing flexible material 400. A conductive linear body 404 contains a CNT yarn.

In the fourth embodiment, a flexible material 402 is a gel sheet, and the RFID 401 includes an antenna portion 406. FIG. 13 illustrates the antenna portion 406 having a spiral pattern. The antenna portion 406 is formed by embroidering the conductive linear body 404 containing a CNT yarn with chain stitch in the gel sheet as the flexible material 402. As the conductive linear body 404, for example, one of the conductive linear bodies 104A to 104G of the aspects A to G can be used alone, or two or more thereof can be used in combination. In addition, the conductive linear body 404 may be embedded in the flexible material 402 (the gel sheet in the fourth embodiment).

The RFID-bearing flexible material 400 functions as an RFID tag, for example, by attaching an IC chip to a dotted region IC4 illustrated in FIG. 13.

The fourth embodiment achieves an RFID-bearing flexible material 400 excellent in flexibility and having corrosion resistance.

Method for Producing RFID-Bearing Flexible Material of Fourth Embodiment

In the fourth embodiment, when the conductive linear body 404 is constituted of only a single CNT yarn, the RFID-bearing flexible material 400 is produced by embroidering an antenna shape illustrated in FIG. 13 with a prepared single CNT yarn onto a gel sheet as the flexible material 402 to form the antenna portion 406. FIG. 13 illustrates an example in which the antenna portion 406 is embroidered using chain stitch.

Use of RFID-Bearing Flexible Material

In embodiments related to the RFID-bearing flexible materials of the first to fourth embodiments and the third embodiment A, the RFID-bearing flexible material can be used as an RFID tag by attaching an IC chip.

For example, an RFID-bearing flexible material with the antenna portion formed on finished clothing or the like can be worn as clothing or the like as is after an IC chip is attached, thus enabling information, such as on the wearer, to be managed.

In addition, the RFID-bearing flexible material produced for the purpose of using by attaching it to an article can be attached to an article of various types after an IC chip is installed, thus enabling information, such as on the article, to be managed.

The size of the RFID-bearing flexible material is not particularly limited and is selected according to the purpose.

Fifth Embodiment

An RFID-bearing article according to a fifth embodiment is an RFID-bearing article, in which the RFID-bearing flexible material according to at least any of the embodiments described above is removably attached to the article.

According to the fifth embodiment, the RFID-bearing flexible material according to the embodiment described above is excellent in flexibility and thus can be attached to conform to the shapes of various articles. This allows the RFID-bearing flexible material to be easily attached to an article having, for example, a curved surface. In addition, this is unlikely to impair the appearance of the article. Furthermore, according to the fifth embodiment, the RFID-bearing flexible material according to the embodiment described above includes the conductive linear body having corrosion resistance and thus can maintain RFID functionality of the article for a longer period.

Sixth Embodiment

A method for producing an RFID-bearing flexible material according to a sixth embodiment is a method for producing an RFID-bearing flexible material according to any of the embodiments described above.

Specifically, the method for producing an RFID-bearing flexible material according to the sixth embodiment is a method for producing an RFID-bearing flexible material, the RFID being attached to a flexible material, the RFID including an antenna portion, and the method includes forming the antenna portion using a conductive linear body containing a CNT yarn.

Examples of the formation of the antenna portion include forming the antenna portion by weaving, knitting, embroidering, or sewing the conductive linear body in the flexible material; and forming the antenna portion by bonding the conductive linear body to the flexible material using a bonding means, such as a bonding agent, but the former (forming the antenna portion by weaving, knitting, embroidering, or sewing the conductive linear body in the flexible material) is preferred.

The method for producing an RFID-bearing flexible material of the sixth embodiment produces an RFID-bearing flexible material excellent in flexibility and having corrosion resistance.

Variation of Embodiment

The present invention is not limited to the embodiments described above and includes variations; modifications, and the like within the scope of achieving the object of the present invention.

In an embodiment related to the RFID-bearing flexible material; the "flexible material" in "weaving; knitting, embroidering; or sewing the conductive linear body in the flexible material" is not particularly limited and is any flexible material in which the conductive linear body can be sewn.

In addition, in an embodiment related to the RFID-bearing flexible material, the flexible material is not limited to a woven fabric, a knitted fabric, an adhesive sheet including a flexible substrate, and a gel sheet. Examples of the flexible material include the flexible materials exemplified above. Among them, the flexible material is preferably a woven fabric; a knitted fabric; a nonwoven fabric; felt; paper; a gel sheet; or an adhesive sheet using a sheet material (e.g.; a synthetic resin film) as a flexible substrate. In addition, the flexible material is also preferably an adhesive sheet using paper, a nonwoven fabric, and a fabric as a flexible substrate. The flexible material may be a commercially available product or may be produced by a well-known production method. However; the adhesive sheet is preferably configured as described in the third embodiment or the third embodiment A.

When the RFID-bearing flexible materials of the first, second, and fourth embodiments is used by attaching them to an article; the RFID-bearing flexible materials may be used by providing an attachment means at any location on the flexible material. In addition, the attachment means may be provided on the article. The attachment means is not particularly limited, and examples of the attachment means include bonding agents, adhesives, various buttons (e.g., such as snap buttons), double-sided tapes, hook-and-loop fasteners, pins, and threads. As the adhesive, the adhesive layer described in the third embodiment may be used.

In the RFID-bearing flexible material of the embodiment, the antenna portion formed using the conductive linear body may be an antenna portion formed by bonding the conductive linear body to a flexible material using a bonding agent or the like.

EXAMPLES

Hereinafter, the present invention will be described in further detail with reference to examples. However, each of these examples does not limit the present invention.

Production of Conductive Linear Body

Example 1-1

A multi-wall CNT forest formed on a silicon wafer was prepared. A CNT was drawn from the side of the CNT forest into a sheet form, the CNT sheet was twisted, and a single CNT yarn was produced. Eight of these CNT yarns were twisted together, and a yarn bundle of CNT yarns was produced. This was used as a conductive linear body of Example 1-1. This CNT yarn bundle had a major axis length of 30 μm.

Comparative Example 1-1

A silver-plated nylon yarn (Shieldex 33/10 dtex (product number) available from Statex) was prepared and used as a conductive linear body of Comparative Example 1-1. This conductive linear body had an average diameter of 60 μm. The average diameter was determined using a scanning electron microscope (SEM) by the following method, Specifically, the diameters of the cross sections at the three locations of the conductive linear body, the cross sections being orthogonal to the longitudinal direction of the conductive linear body, were measured. The three locations are, namely, two locations at a distance of 1 cm from each end portion of the conductive linear body, and at the central portion of the conductive linear body. These diameters were averaged to determine the average diameter. The same applies hereinafter.

Comparative Example 1-2

A copper wire was prepared and used as a conductive linear body of Comparative Example 1-2. This conductive linear body had an average diameter of 50 μm.

Evaluation 1

The conductive linear bodies of Example 1-1 and Comparative Examples 1-1 to 1-2 were cut with a cutter, and test pieces having a length of about 10 cm were produced. These test pieces were used to measure linear resistance and to carry out a bending test. The results are shown in Table 1.

Linear Resistance

The linear resistance of the conductive linear body was measured as follows.

First, a silver paste was applied to both ends of the conductive linear body, the resistance of the portion between the silver pastes was measured, and the resistance value (in Ω) of the conductive linear body was determined. Then, the resulting resistance value was divided by the distance between the silver pastes (7 cm), and thus the linear resistance (Ω/cm) of the conductive linear body was determined.

Bending Test (Flexure Test)

Figure 14:
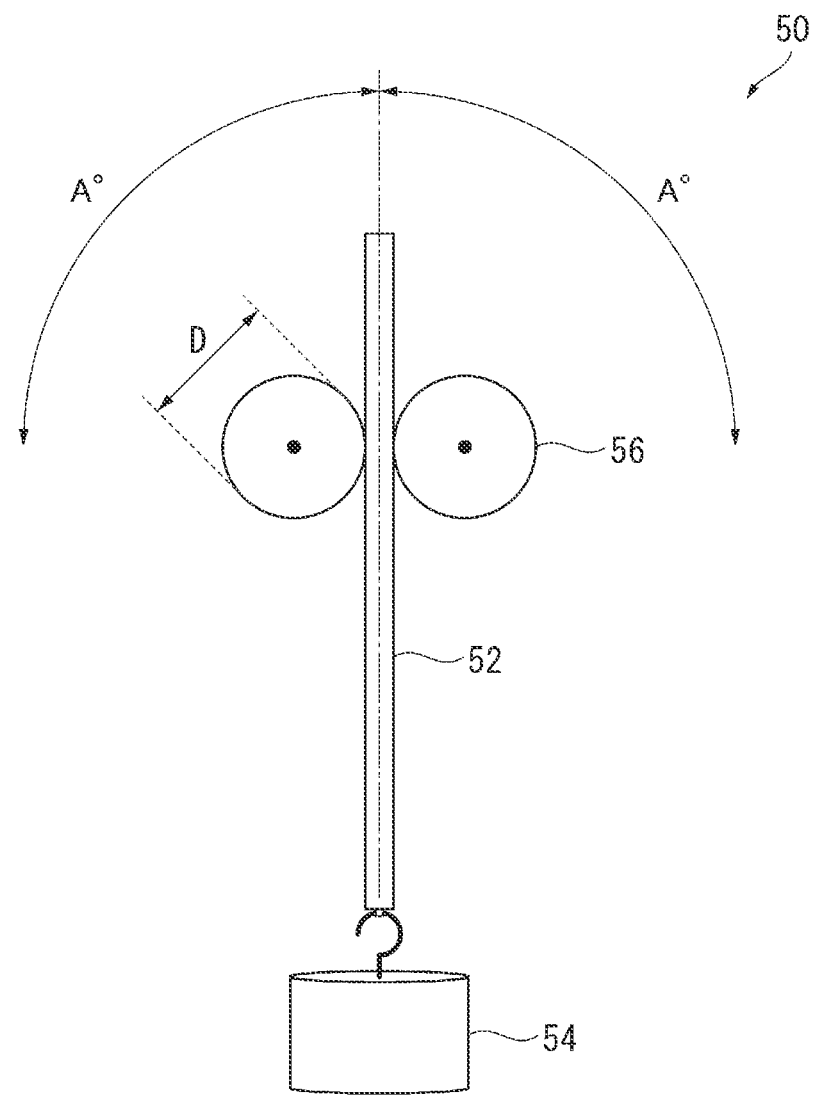
FIG. 14 is a schematic view of a bending tester used in a bending test.

The bending test was carried out using a bending tester 50 illustrated in FIG. 14.

As illustrated in FIG. 14, a test piece 52 was positioned between a pair of mandrels 56 (shaft diameter D=0.3 mm), and a weight 54 with a load of 50 MPa was suspended at the bottom of the test piece 52. Then, the test piece 52 was moved along the pair of mandrels 56 while being bent at a bend angle A°=±90° in the left and right directions. While the bending was repeated, a constant current 100 μA was applied to both ends of the test piece 52, and from the change in the resistance value of the test piece 52, the number of bending cycles when the linear resistance drops by 50% compared to that at the start of the test was recorded as the evaluation of bending fatigue.

Note that the bending speed was 15 Hz, and one reciprocating bending in the left and right directions was counted as one cycle of bending.

TABLE 1

| | | Example 1-1 | Comparative Example 1-1 | Comparative Example 1-2 |
|---|---|---|---|---|
| Conductive linear body | Type | CNT yarn | Silver-plated nylon yarn | Copper wire |
| | Major axis length or average diameter [μm] | 30 | 60 | 50 |
| | Linear resistance [Ω/cm] | $2.5 \times 10^2$ | $7.4 \times 10^1$ | $2.4 \times 10^{-1}$ |
| Evaluation | Bending fatigue (Number of bending cycles) | More than 1000000 | 100000 | 4000 |

The conductive linear body of Example 1-1 was significantly superior in bending fatigue resistance over the conductive linear bodies of Comparative Example 1-1 and Comparative Example 1-2.

Thus, formation of the antenna portion using the conductive linear body containing a CNT yarn of Example 1-1 in the flexible material can achieve an RFID-bearing flexible material excellent in flexibility. In addition, the conductive linear body of Example 1-1 has better corrosion resistance compared to the conductive linear body of Comparative Example 1-2 formed of copper wire, and thus an RFID formed using the conductive linear body of Example 1-1 is believed to be able to impart RFID functionality for a longer period. This is also inferred from the result of the washing test described below, where a conductive linear body knitted in a test knitted fabric of Example 2-1 had almost no change in resistance after 20 cycles of washing.

Production of Flexible Material with Conductive Linear Body

Example 2-1

Figure 15:
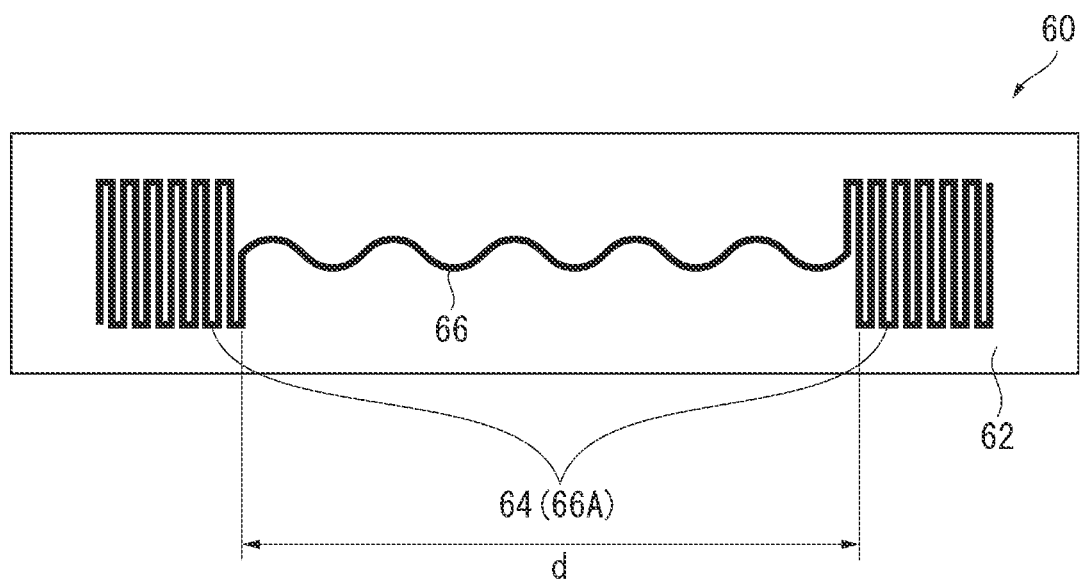
FIG. 15 is a schematic view of a test knitted fabrics used in an elasticity test and a washing test.

As a flexible material with a conductive linear body, a test knitted fabric 60 illustrated in FIG. 15 was produced.

The resulting test knitted fabric 60 was configured as follows.

Size of test knitted fabric 60: width 20 mm×length 110 mm

Thickness of test knitted fabric 60: about 500 μm

Sizes of each electrode (region where a conductive linear body 66A in a quadrilateral shape is knitted at both end portions of a conductive linear body 66) 64: 8 mm×8 mm Distance between a pair of electrodes 64 (reference sign d in FIG. 15): 70 mm First, a knitted fabric 62 (width 20 mm×length 110 mm, thickness of about 500 μm) illustrated in FIG. 15 was produced by a method of knitting an elastic yarn (a yarn having elasticity) of a polyurethane fiber covered with polyester while stretching the elastic yarn.

Then, the conductive linear body 66 (the yarn bundle of eight CNT yarns twisted together) produced in Example 1-1 was knitted in a substantially straight line in a manner advancing in the knitting direction between the stitches of the knitted fabric 62.

In addition, as illustrated in FIG. 15, the same conductive linear body as the knitted conductive linear body 66 was knitted on the same surface of the knitted fabric 62 with repeated bending and thus forming quadrilateral shapes at both end portions of the conductive linear body 66 woven in a substantially straight line. Two regions where the conductive linear body 66A was woven in a quadrilateral shape were used as a pair of electrodes 64.

Comparative Example 2-1

A test knitted fabric of Comparative Example 2-1 was obtained in the same manner as in Example 2-1 with the exception that a silver-plated polyester yarn (ODEX40/2 marketed by Osaka Electric Co., Ltd.) was used instead of the conductive linear body used in Example 2-1.

Evaluation 2

An elasticity test was carried out using the test knitted fabrics of Example 2-1 and Comparative Example 2-1.

Figure 16:
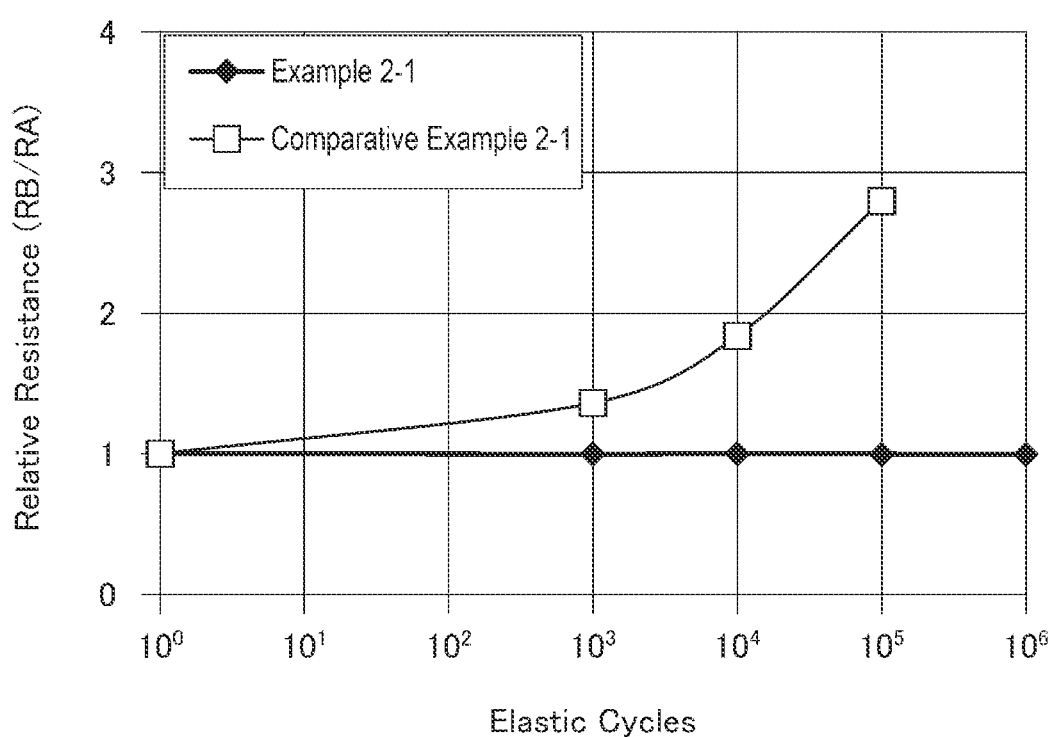
FIG. 16 is a graph illustrating the results of elasticity tests of Example 2-1 and Comparative Example 2-1.

The results are illustrated in FIG. 16.

Elasticity Test

The elasticity test was carried out according to the following method.

First, a tension and compression operation, in which the test knitted fabric 60 of Example 2-1 illustrated in FIG. 15 was stretched by 60% of the length of the test knitted fabric 60 and then compressed until it returned to the original state, was carried out 1000 times, 10000 times, and 100000 times with a reciprocating cycle at 1 Hz, and resistance values of the conductive linear body 66 (resistance values between the pair of the electrodes 64 in FIG. 15) before and after the tension and compression operation were measured at each cycle. Note that the tension and compression operation was carried out by stretching and compressing the test knitted fabric 60 in the longitudinal direction.

The resistance values of the conductive linear body of the test knitted fabric of Comparative Example 2-1 were also measured in the same manner as in Example 2-1.

A resistance value RA (Ω) of the conductive linear body 66 before stretching the test knitted fabric and a resistance value RB (Ω) of the conductive linear body 66 at an elongation of 0% after each tension and compression test (1000 times, 10000 times, and 100000 times) were measured. Note that the resistance value RA (Ω) of the conductive linear body 66 before stretching the test knitted fabric 60 means the resistance value at the tension and compression cycle of 0.

In addition, a "resistance value (relative value) of the conductive linear body before and after tension and compression" is calculated by the following equation.

$$\text{Resistance value(relative value) of conductive linear body before and after tension and compression} = RB/RA \quad \text{Equation:}$$

As illustrated in FIG. 16, the conductive linear body 66 of Example 2-1 had almost no change in the resistance value after 100000 cycles of tension and compression. That is, the test knitted fabric 60 of Example 2-1 was significantly superior in elasticity over the test knitted fabric of Comparative Example 2-1.

Thus, formation of the antenna portion using the conductive linear body containing a CNT yarn in the flexible material can achieve an RFID-bearing flexible material excellent in flexibility.

Evaluation 3

A washing test was carried out using the test knitted fabric of Example 2-1 and Comparative Example 2-1.

Figure 17:
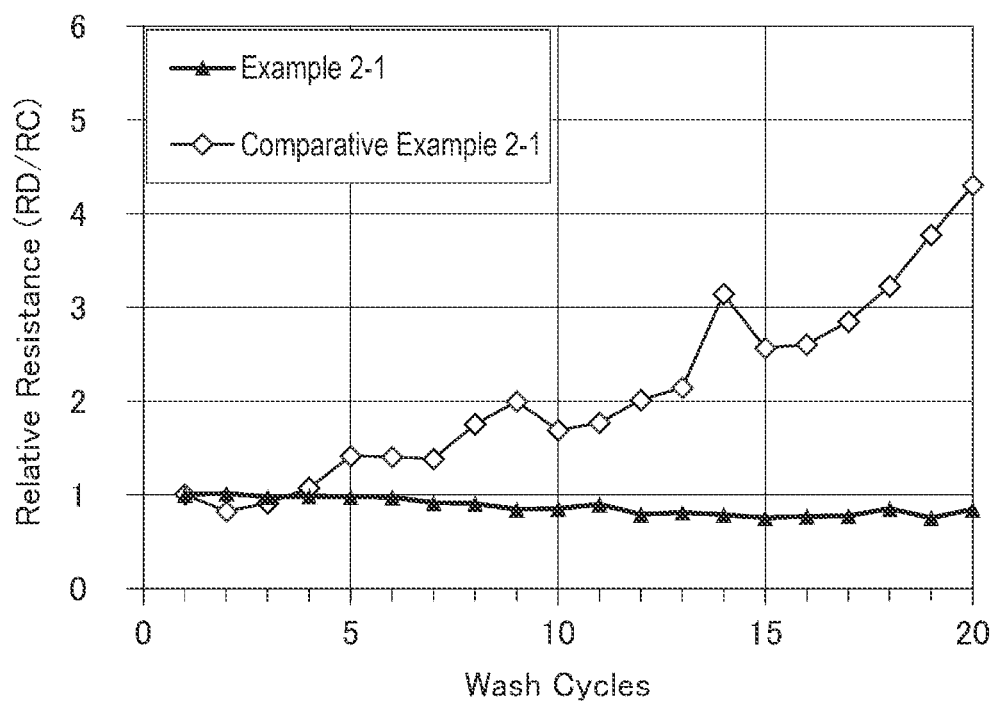
FIG. 17 is a graph illustrating the results of washing tests of Example 2-1 and Comparative Example 2-1.

The results are illustrated in FIG. 17.

Washing Test

The washing test was carried out in accordance with the method defined by RA111 of the AATCC Committee. Specifically, the washing test was carried out in the same manner as the method defined by RA111 with the exception that a digital multi-meter (DM with a resistance measurement resolution of 0.1Ω and a precision of 0.9% was used instead of a volt-ohm meter (VOM) with a precision of 0.1%.

The test knitted fabric 60 was subjected to 1 to 20 cycles of washing, and the resistance values of the conductive linear body 66 before and after washing (resistance values between the electrodes 64 in FIG. 15) were measured at each washing cycle.

The resistance values of the conductive linear body of the test knitted fabric of Comparative Example 2-1 were also measured in the same manner as in Example 2-1.

The resistance values of the conductive linear body were measured in the same manner as in the method in the elasticity test described above.

A resistance value RC (Ω) of the conductive linear body before washing of the test knitted fabric and a resistance value RD (Ω) of the conductive linear body after washing were measured, and a "resistance value (relative value) of the conductive linear body before and after washing" was calculated by the following equation.

$$\text{Resistance value(relative value) of conductive linear body before and after washing} = RD/RC \quad \text{Equation:}$$

As illustrated in FIG. 17, the conductive linear body 66 of Example 2-1 had almost no change in resistance after 20 cycles of washing. That is, the test knitted fabric 60 of Example 2-1 was significantly superior in washing resistance over the test knitted fabric of Comparative Example 2-1.

Thus, production of the RFID using the conductive linear body containing a CNT yarn in the flexible material can achieve an RFID-bearing flexible material excellent in washing resistance as well.

The invention claimed is:

1. A radio-frequency-identifier (RFID)-bearing flexible material comprising:
   a flexible material; and
   an RFID attached to the flexible material, wherein:
   the RFID comprises an antenna portion,
   the antenna portion is formed of a conductive linear body containing a carbon nanotube yarn and a resin,
   the carbon nanotube yarn is a yarn bundle of a plurality of carbon nanotube yarns bundled together or one strand of carbon nanotube yarn,
   the resin is a thread resin,
   the thread resin and the yarn bundle or the thread resin and the one strand of carbon nanotube yarn are twisted together,
   when the carbon nanotube yarn is the yarn bundle,
      a major axis length of a cross section of the yarn bundle orthogonal to a longitudinal axis direction of the yarn bundle is from 7 µm to 5000 µm, and when the carbon nanotube yarn is the one strand of carbon nanotube yarn,
      a diameter of the one strand of carbon nanotube yarn is from 5 µm to 100 µm.

2. The RFID-bearing flexible material according to claim 1, wherein the resin is a thermoplastic resin or a curable resin.

3. The RFID-bearing flexible material according to claim 1, wherein
   the conductive linear body further comprises a conductive material other than the carbon nanotube yarn.

4. The RFID-bearing flexible material according to claim 3, wherein
   the conductive material is amorphous carbon, graphite, fullerene, graphene, or carbon nanotube particles.

5. The RFID-bearing flexible material according to claim 1,
   wherein the flexible material is a woven fabric, a knitted fabric, a nonwoven fabric, felt, paper, a gel sheet, or an adhesive sheet comprising a flexible substrate.

6. The RFID-bearing flexible material according to claim 1, wherein the RFID-bearing flexible material is removably attached to an article.

7. The RFID-bearing flexible material according to claim 6, wherein the flexible material comprises an adhesive layer for removably adhering to the article.

8. The RFID-bearing flexible material according to claim 1, wherein
   the carbon nanotube yarn is the yarn bundle.

9. The RFID-bearing flexible material according to claim 1, wherein
   the antenna portion is formed by weaving, knitting, embroidering, or sewing the conductive linear body in the flexible material.

10. A radio-frequency-identifier (RFID)-bearing article comprising, the RFID-bearing flexible material according to claim 1, wherein the RFID-bearing flexible material is removably attached to the RFID-bearing article.

11. A method for producing a radio-frequency-identifier (RFID)-bearing flexible material, wherein the RFID-bearing flexible material comprises:
   a flexible material; and
   an RFID attached to the flexible material,
   wherein:
   the RFID comprises an antenna portion,
   the antenna portion is formed of a conductive linear body containing a carbon nanotube yarn and a resin,
   the carbon nanotube yarn is a yarn bundle of a plurality of carbon nanotube yarns bundled together or one strand of carbon nanotube yarn,
   the resin is a thread resin,
   the thread resin and the yarn bundle or the thread resin and the one strand of carbon nanotube yarn are twisted together,
   when the carbon nanotube yarn is the yarn bundle,
      a major axis length of a cross section of the yarn bundle orthogonal to a longitudinal axis direction of the yarn bundle is from 7 µm to 5000 µm, and when the carbon nanotube yarn is the one strand of carbon nanotube yarn,
      a diameter of the one strand of carbon nanotube yarn is from 5 µm to 100 µm, the method comprising:
   drawing a carbon nanotube from an end portion of a carbon nanotube forest into a sheet form to form the strand of carbon nanotube yarn or the yarn bundle of the plurality of carbon nanotube yarns bundled together;
   twisting together the thread resin and the one strand of carbon nanotube yarn or the yarn bundle of the plurality of carbon nanotube yarns; and
   forming the antenna portion on the flexible material using the conductive linear body obtained by the twisting.

* * * * *